(12) United States Patent
Hanson et al.

(10) Patent No.: US 9,096,106 B2
(45) Date of Patent: Aug. 4, 2015

(54) MULTI-ROLE UNMANNED VEHICLE SYSTEM AND ASSOCIATED METHODS

(75) Inventors: Bruce Hanson, Melbourne, FL (US); Mark Everly, Palm Bay, FL (US)

(73) Assignee: UNMANNED INNOVATIONS, INC, Melbourne, FL (US)

( * ) Notice: Subject to any disclaimer, the term of this patent is extended or adjusted under 35 U.S.C. 154(b) by 116 days.

(21) Appl. No.: 13/470,866

(22) Filed: May 14, 2012

(65) Prior Publication Data

US 2012/0290164 A1 Nov. 15, 2012

Related U.S. Application Data

(60) Provisional application No. 61/485,477, filed on May 12, 2011.

(51) Int. Cl.
| | |
|---|---|
| *G01C 22/00* | (2006.01) |
| *G05D 1/00* | (2006.01) |
| *B60F 5/00* | (2006.01) |
| *B63B 1/04* | (2006.01) |

(Continued)

(52) U.S. Cl.
CPC . *B60F 5/00* (2013.01); *B63B 1/042* (2013.01); *B63B 1/322* (2013.01); *B63B 2001/206* (2013.01); *B63B 2035/006* (2013.01); *B63B 2035/007* (2013.01); *B63G 8/22* (2013.01); *B63G 8/26* (2013.01); *B63G 2008/002* (2013.01); *B63G 2008/004* (2013.01); *B64C 35/00* (2013.01); *B64C 39/024* (2013.01); *B64C 2201/028* (2013.01); *Y02T 70/12* (2013.01)

(58) Field of Classification Search
USPC ............... 701/2, 23; 244/13, 17.23, 2, 39; 114/312, 333, 127, 174, 222, 337, 114/61.12, 67 A; 440/6, 13, 3

See application file for complete search history.

(56) References Cited

U.S. PATENT DOCUMENTS

| | | | | |
|---|---|---|---|---|
| 5,415,365 | A  * | 5/1995 | Ratliff | 244/101 |
| 6,341,571 | B1 * | 1/2002 | Russell et al. | 114/39.21 |

(Continued)

OTHER PUBLICATIONS

A model estimation and multi-variable control of an unmanned surface vehicle with two fixed thrusters; Jeong-Hong Park ; Hyung-Won Shim ; Bong-Huan Jun ; Sea-Moon Kim ; Pan-Mook Lee ; Yong-Kon Lim; OCEANS 2010 IEEE—Sydney; DOI: 10.1109/OCEANSSYD.2010.5603843; Publication Year: 2010 , pp. 1-5.*

(Continued)

*Primary Examiner* — Tuan C. To
*Assistant Examiner* — Isaac Smith
(74) *Attorney, Agent, or Firm* — Mark R. Malek; William A. Harding; Widerman Malek, PL

(57) ABSTRACT

An unmanned vehicle may include a vehicle body that comprises an enclosed hull. The unmanned vehicle may include a propulsion, a ballast control system, a center of gravity system, a pressurization system, a control surface system, a navigation control system, and an on board master control system. The on board master control system may execute local control over operation of the various systems of the unmanned vehicle. The unmanned vehicle may also include a power supply carried by a portion of the vehicle body to provide power to the various systems. The various systems of the unmanned vehicle may be independently operable to support selective operation of the unmanned vehicle in the air, on the surface of the water, and below the surface of the water.

43 Claims, 17 Drawing Sheets

(51) Int. Cl.

| | | |
|---|---|---|
| B63G 8/00 | (2006.01) | |
| B63B 35/00 | (2006.01) | |
| B64C 35/00 | (2006.01) | |
| B64C 39/02 | (2006.01) | |
| B63B 1/32 | (2006.01) | |
| B63G 8/22 | (2006.01) | |
| B63G 8/26 | (2006.01) | |
| B63B 1/20 | (2006.01) | |

(56) References Cited

U.S. PATENT DOCUMENTS

| | | | | |
|---|---|---|---|---|
| 6,640,739 | B2 * | 11/2003 | Woodall et al. | 114/312 |
| 6,672,234 | B2 * | 1/2004 | Osmundsvaag | 114/67 A |
| 6,742,741 | B1 * | 6/2004 | Rivoli | 244/12.1 |
| 6,772,705 | B2 * | 8/2004 | Leonard et al. | 114/333 |
| 6,807,921 | B2 | 10/2004 | Huntsman | |
| 7,264,204 | B1 | 9/2007 | Portmann | |
| 7,290,496 | B2 * | 11/2007 | Asfar et al. | 114/312 |
| 7,296,530 | B1 | 11/2007 | Bernstein et al. | |
| 7,328,669 | B2 | 2/2008 | Adams | |
| 7,789,723 | B2 * | 9/2010 | Dane et al. | 440/6 |
| 2005/0109259 | A1 | 5/2005 | August | |
| 2007/0051292 | A1 * | 3/2007 | Kilbourn et al. | 114/311 |
| 2010/0200689 | A1 * | 8/2010 | Grip | 244/2 |
| 2011/0155840 | A1 * | 6/2011 | Lind et al. | 244/13 |
| 2011/0226174 | A1 * | 9/2011 | Parks | 114/313 |
| 2012/0204780 | A1 * | 8/2012 | Harbin | 114/291 |
| 2012/0318184 | A1 * | 12/2012 | Morrison | 114/125 |
| 2012/0318188 | A1 * | 12/2012 | Hudson et al. | 114/333 |

OTHER PUBLICATIONS

The Wave Glider: A persistent platform for ocean science; Manley, J.; Willcox, S.; OCEANS 2010 IEEE—Sydney; DOI: 10.1109/OCEANSSYD.2010.5603614; Publication Year: 2010, pp. 1-5.*

* cited by examiner

MULTI-ROLE UNMANNED VEHICLE SYSTEM AND ASSOCIATED METHODS

RELATED APPLICATIONS

This application is related to and claims the benefit of U.S. Provisional Patent Application Ser. No. 61/485,477 titled MARITIME MULTI-ROLE UNMANNED VEHICLE SYSTEM filed on May 12, 2011, the entire contents of which are incorporated herein by reference.

FIELD OF THE INVENTION

The present invention relates generally to the field of unmanned, autonomous vehicles. In particular, the invention relates to unmanned vehicles capable of operating in atmospheric, land, marine, and submarine environments, and equipped with autonomous control systems and a variety of energy sources to enable extended periods of operation, and associated methods.

BACKGROUND OF THE INVENTION

The United States military is increasing its use of unmanned vehicles across all service branches and in all environments. Examples of currently planned uses of unmanned vehicles in the marine environment are for intelligence, surveillance and reconnaissance (ISR) missions, mine and submarine detection, maritime interdiction missions and harbor security. The scope of military missions for unmanned vehicles is currently planned to increase significantly and will encompass a wider range of missions and uses.

The commercial market also is increasing its use of unmanned vehicles. Examples include search and rescue, drug interdiction, remote launch and recovery of external payloads, autonomous environmental testing, oil spill collection and monitoring, weather monitoring, and real time tsunami data collection and monitoring.

An advantage of unmanned vehicles is the ability to cover large areas of operation with a significantly reduced number of people than would be required to perform the same task in a manned environment. Another advantage is the ability to deploy unmanned systems into environments that are hostile or dangerous to people.

In the marine environment, most current unmanned vehicle designs are based on retrofits of manned vehicle designs, and incur operational and performance envelope limitations built into vehicles designed for carrying people, such as described in U.S. Pat. No. 7,789,723 to Dane et. al. Alternatively, systems designed specifically as unmanned vehicles, such as described in U.S. Pat. No. 6,807,921 to Huntsman, typically have been designed for particular characteristics, such as, for example, endurance or underwater performance, but have not been designed for a broad range of characteristics.

A need exists for a combination of multi-mode operational characteristics and integrated systems to provide for a controllable autonomous network of unmanned maritime vehicles capable of covering large areas of diverse environments, whether in the air, on land, on the surface of the water, or underwater. A need also exists to advance the state of the art of unmanned vehicles by enabling fewer people to execute more complex missions over larger operational areas.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the foregoing in mind, one of the many objects of the present invention is to provide an advantageously and readily deployable unmanned vehicle with enhanced operational characteristics in multiple modes, that is, on the surface of water, underwater, in the air, and on land. These enhanced operational characteristics include, but are not limited to, speed, maneuverability, sea state handling, endurance, stealth characteristics, payload capacity, sensory capability, communication ability and operational autonomy. It is further an object of the present invention to provide unmanned vehicles with endurance characteristics that enable them to autonomously operate for weeks, months and years without human intervention. It is further an object of the present invention to provide unmanned vehicles in a range of sizes that include, but are not limited to, unmanned vehicles small and light enough for a single person to carry, larger unmanned vehicles that can fit in standard maritime containers, and unmanned vehicles as large as current manned ships. It is further an object of the present invention to provide off board command, control and communication systems that enable people to interact with the unmanned vehicles in ways that advantageously exploit various degrees of autonomy and time synchronization. It is further an object of the present invention to provide unmanned vehicles that can communicate through a variety of means with an integrated off board system to facilitate execution of more complex missions over larger maritime areas with fewer human operators.

These and other objects, features and advantages according to embodiments of the present invention are provided by an unmanned vehicle capable of operating in the air, on the surface of water, below the surface of water, and on land. The aerohydrodynamically configured body of the unmanned vehicle may carry pressurized compartments that may house various independently operable on board systems that may support selective operation of the unmanned vehicle. These on board systems may include hybrid propulsion and power, ballast, center of gravity, pressurization, control surfaces, navigation, on board control and communications. Communication interfaces between on board systems and off board mission systems may allow remote control of the unmanned vehicle.

More particularly, the unmanned vehicle may include a vehicle body. The vehicle body may be configured to have the general appearance of an aerohydrodynamic wing. The vehicle body may include a pair of opposing sponsons that may have a stepped hull design, and may include a tunnel and a wing both medially positioned on the vehicle body. The vehicle body may have an enclosed, pressure-sealed hull that may define enclosed interior compartments each of which may be capable of pressurization, and that may be adapted to carry a propulsion system, a ballast system, a center of gravity system, a pressurization system, a control surface system, a navigation control system, and an on board control system. The vehicle body may include a bottom, sides extending upwardly from the bottom, and a top which may be scalable proportionately to provide a vehicle body that may have a range of sizes. The vehicle body may be made of a fiberglass material, carbon fiber material, or aramid fiber material, such as KEVLAR®.

The unmanned vehicle may include hybrid propulsion and power systems to propel the unmanned vehicle. The propulsion system may include a land propulsion configuration for propelling the vehicle across a substantially planar terrain surface, may include a marine propulsion configuration for propelling the vehicle across a substantially planar water surface, may include a submarine propulsion configuration for propelling the vehicle while submerged in water, and may include an aircraft propulsion configuration for propelling the vehicle in atmospheric flight. The marine and submarine propulsion configurations may include vectored thrust apparatuses that may include propellers and water jets. The hybrid propulsion system may be powered by electric motors, diesel motors, turbine engines, and nuclear reactors.

The unmanned vehicle may include a number of power supplies that may be carried by the vehicle body and may provide electric power to the propulsion system, ballast system, center of gravity system, pressurization system, control surface system, navigation control system, and on board master control system. The power supplies may include batteries which may be recharged using on board solar energy collectors, wave motion energy collectors, and generated energy collectors.

The unmanned vehicle may include a ballast system that may be carried in a compartment inside the vehicle body and may be employed to vary buoyancy of the unmanned vehicle to facilitate selective submerging and re-surfacing of the unmanned vehicle. The ballast system may include a ballast chamber, a pressure tank, water pumps, water ports, air ports, and ballast sensors. The pressure tank may be vented to a ballast chamber by locking electronic valves that may regulate air flow between the pressure tank and the ballast chamber. The ballast chamber may be connected by pipes to air ports. Locking electronic valves may regulate the flow of air from the air ports into the ballast chamber, and also the evacuation of air from the ballast chamber through the air ports. The ballast chamber may be connected by pipes to water ports. Locking electronic valves and water pumps may cooperate to regulate the flow of water into the ballast chamber, and also the evacuation of water from the ballast chamber through the water ports. Ballast sensors may measure the volume of water and air in the ballast chamber.

The unmanned vehicle may include a center of gravity system that may be carried in a compartment inside the vehicle body and may vary the center of gravity of the unmanned vehicle. The center of gravity system may include a threaded actuator rod and an internally threaded weight. The actuator rod may have rotational bearings on one end and may have motor actuators on the other end. The threaded actuator rod may be encased in the internally threaded weight, the position of which may be adjustable along the length of the actuator rod and may move the center of gravity of the unmanned vehicle along the two perpendicular axes for roll and pitch.

The unmanned vehicle may include a pressurization system that may vary pressure within enclosed interior compartments and may apply pressurization to enable advantageous sealed hull strength-to-weight characteristics during selective operation of the unmanned vehicle on land, in the air, on the surface of the water, and below the surface of the water. The pressurization system may include a pressure tank, air pumps, pressure sensors, air ports, and bidirectional seals in the hull. The pressure tank, air pumps, and pressure sensors may be carried in compartments inside the vehicle body. Bidirectional seals in the hull may be applied to air ports as well as to other openings, vents, and moving services that may be carried by the vehicle body. The pressure tank may be affixed to the interior portion of the sealed hull and may be vented to enclosed compartments by locking electronic valves and air pumps that may cooperate to regulate air flow from the pressure tank to those compartments. The pressure tank may be connected by pipes to air ports. Locking electronic valves and air pumps may cooperate to regulate the flow of air from air ports into the pressure tank. Interior compartments may be connected by pipes to air ports. Locking electronic valves may regulate the evacuation of air from each compartment through the air ports. The pressure sensors may monitor air pressure inside the sealed hull and also ambient pressure outside the sealed hull.

The unmanned vehicle may include control surface systems that may include a rudder, trim plates, forward canards, and control position sensors used to maneuver the unmanned vehicle. The rudder may be mounted on a strut that may be affixed externally to the vehicle body and substantially near the stern of the vehicle body. Trim plates may be affixed externally to the vehicle body and may articulate independently and bidirectionally. Forward canards may be affixed externally to the vehicle body and may articulate independently in two directions to achieve maximum roll of the unmanned vehicle. Control position sensors may monitor the position of the rudder, the trim plates, and the forward canards to support physical maneuvering of the unmanned vehicle on land, in the air, on the surface of the water, and below the surface of the water.

The unmanned vehicle may include a device rack system that may provide mechanical, power, and signal mount points for auxiliary devices that may articulate from the vehicle body of the unmanned vehicle. The device rack system may include a retractable platform that may position an auxiliary device to advantageously extrude from the surface of the vehicle body.

The unmanned vehicle may include a payload deck system that may provide mechanical, power, and signal mount points for payload modules that may interchangeably affix to the vehicle body of the unmanned vehicle. The payload deck system may present a universal mounting interface for diverse payload modules that can expand the operational characteristics and mission capabilities of the unmanned vehicle.

The unmanned vehicle may include a navigation control system to control the speed and direction of travel of the unmanned vehicle in multiple modes, including on land, in the air, on the surface of the water, and underwater.

The unmanned vehicle may include an on board master control system that may execute local control over operation of the propulsion system, ballast system, center of gravity system, pressurization system, control surface system, and navigation control system. An off board control system may interface with the onboard master control system and may execute remote control over the operation of the unmanned vehicle based on mission objectives that may be defined external to the on board master control system.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Figure 1:
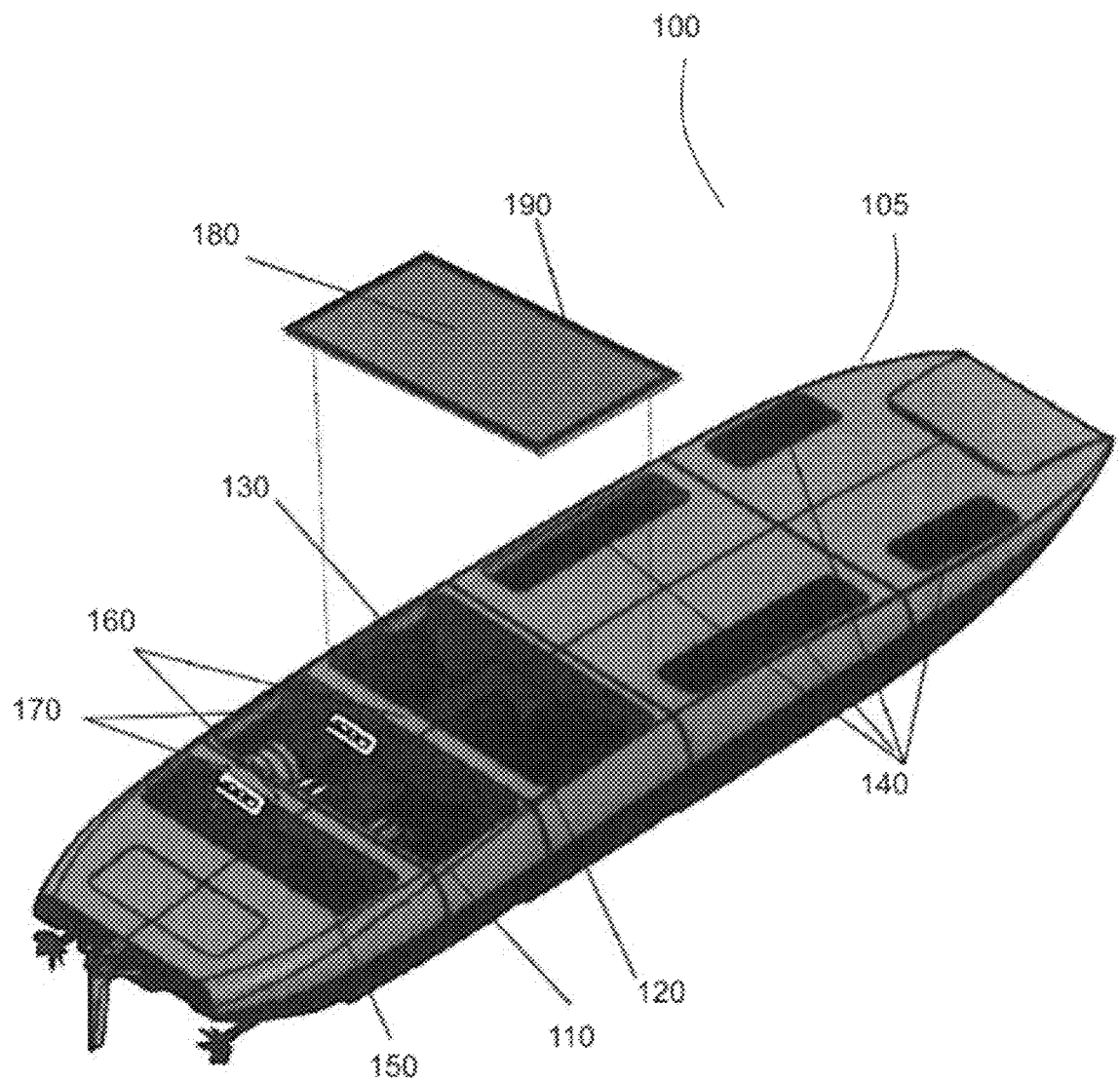
FIG. 1 is an exploded solid model view of an unmanned vehicle according to an embodiment of the present invention.
Figure 2:
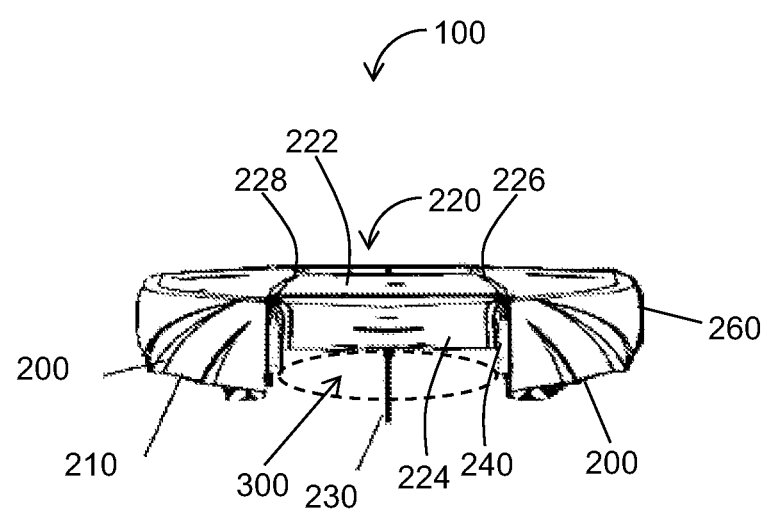
FIG. 2 is a front elevation view of an unmanned vehicle according to an embodiment of the present invention.

Referring now to FIGS. 1 and 2, an unmanned vehicle 100 capable of operating on land, in the air, on the surface of the water, and underwater according to an embodiment of the present invention will now be discussed. Throughout this disclosure, the unmanned vehicle 100 may also be referred to as a vehicle, an autonomous vehicle, or the invention. Alternate references of the unmanned vehicle 100 in this disclosure are not meant to be limiting in any way.

Figure 3:
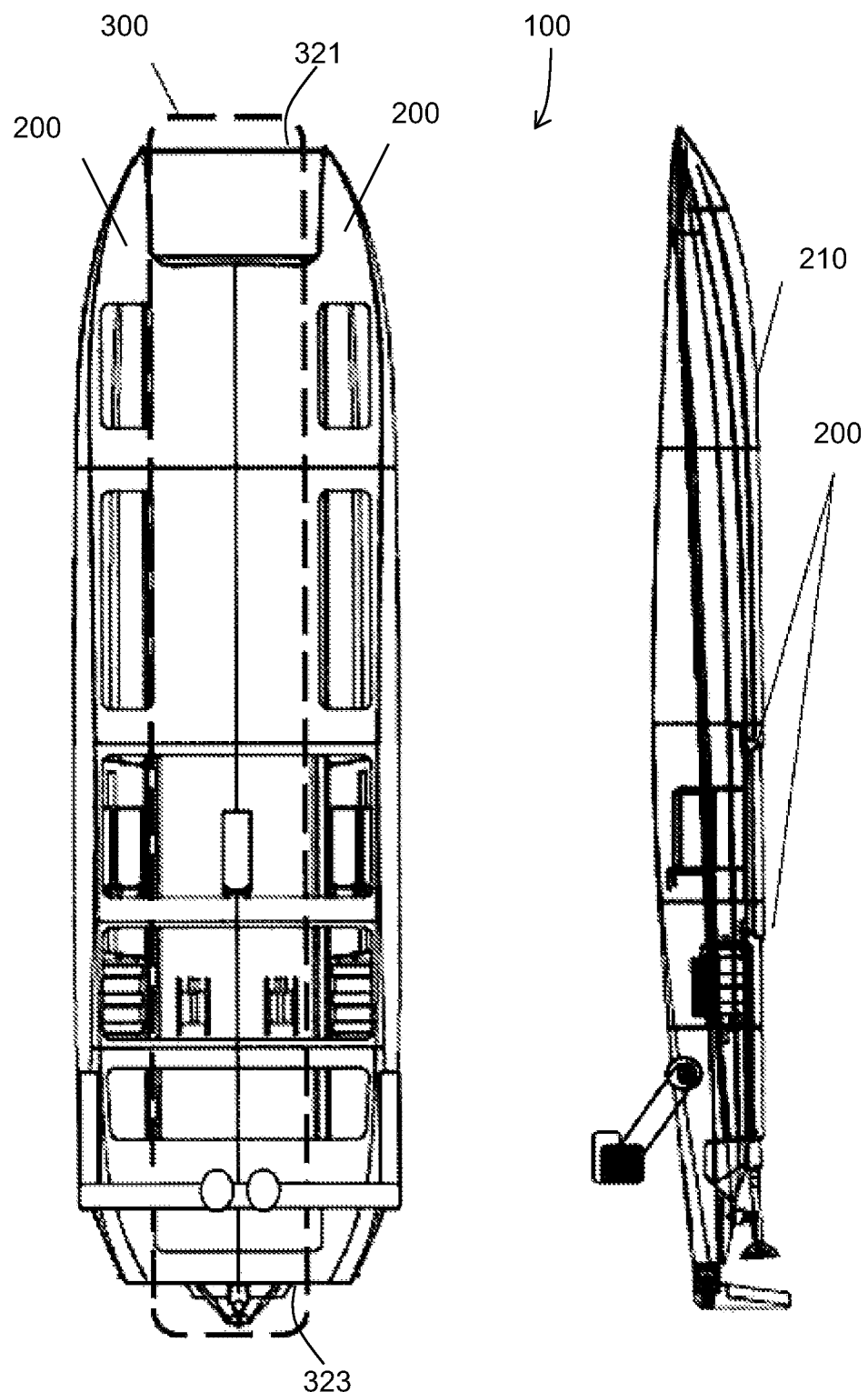
FIG. 3 is a top plan view and a side elevation view of an unmanned vehicle according to an embodiment of the present invention.

The unmanned vehicle 100 according to an embodiment of the present invention may include a vehicle body 105 which may be configured as an aerohydrodynamic wing, which will now be described in greater detail. The vehicle body 105 according to an embodiment of the present invention may exhibit the shape characteristics of a catamaran including two opposing and substantially-parallel sponsons 200 each having a stepped hull 210. The stepped hull design may advantageously increase the efficiency of the unmanned vehicle 100 by providing lower drag and increased stability at speed. The stepped hull 210 may also enhance maneuverability of the unmanned vehicle 100. Referring now additionally to FIG. 3, the catamaran-style stepped hull 210 additionally may have shape characteristics that provide aerodynamic stability and control in the form of a central tunnel portion 300 and a central wing-shaped portion 220 of the vehicle body 105. The wing 220 may be characterized by a leading edge 321, a trailing edge 323, a port edge 226, a starboard edge 228, an upper surface 222, and a lower surface 224. The two sponsons 200 may be coupled to the port 226 and starboard 228 edges of the wing 220, respectively. Each sponson 200 may be characterized by a proximal wall 240 positioned adjacent the centrally-positioned wing 220 and a distal wall 260 positioned opposite the proximal wall 240. The two proximal walls 240 of the sponsons 200 and the lower surface 224 of the wing 220 may define a tunnel 300 through which fluid (for example, and without limitation, water and/or air) may pass when the vehicle 100 is in motion relative to the fluid. The central wing-shaped portion 220 of the vehicle body 105 may have varying widths according to the mission-driven aerodynamic and hydrodynamic characteristics of the unmanned vehicle 100. Those skilled in the art will appreciate that the hull 210 of the unmanned vehicle 100 does not necessarily have to be a stepped hull but, instead, can have any other shape. More specifically, it is contemplated that the hull 210 of the unmanned vehicle 100 may be smooth, for example, or may have any other shape while still achieving the goals, features and objectives according to the various embodiments of the present invention.

Referring now back to FIG. 1, the vehicle body 105 of the unmanned vehicle 100 may carry a plurality of compartments to house propulsion and power components 110, electrical and control components 120, center of gravity adjustment actuators 130, ballast components 140, and internally stowed payloads 150. These compartments may be sealed from each other by partitions 160 integrated into the vehicle body 105 with sealed electrical and mechanical interconnections 170. All vehicle compartments are preferably sealed from the external environment by hatches 180 with pressure seals 190 designed for both submarine and atmospheric environments. The plurality of sealed compartments can be pressurized to advantageously allow for deeper submerged operation, and may be designed to maintain sealed integrity to a submerged depth in excess of one hundred (100) feet. Those skilled in the art will appreciate that each of the above-mentioned components do not necessarily need to be positioned in separate compartments. The unmanned vehicle 100 according to an embodiment of the present invention does contemplate that the various components may be organized in combined compartments, in one single compartment, in a combination of compartments, or in any other configuration. For example, and without limitation, the plurality of sealed compartments may define an on-board environment inside one or more of the sealed compartments, and an external environment outside one or more of the sealed compartments. The present invention may have a sensor system to collect both vehicle 100 functional systems data and also external environmental data. The sensor system may comprise a variable set of sensors of many kinds that collect a wide variety of data from disparate sources, an electronic communication network over which the sensors may send data, and a data processing and routing system for collected sensor data. In one embodiment of the present invention, data representing the condition of components in the on-board environment may be collected by functional sensors such as the following: Global Position System (GPS), electronic compass, accelerometers, roll, pitch, yaw orientation, depth, pressure, temperature, voltage, drive train revolutions per minute (RPM), vibration at multiple locations, vehicle humidity, fuel level, and charge level. External environmental data may be collected by sensors that may include a video camera with computer-controlled articulation, zoom and night vision; electro-optical/infrared imaging and an audio sensor. Optional sensors may include, but are not limited to, radar, sonar, chemical and radiation sensors. External sensors may be mounted on a retractable device rack, as described below. Sensor signals may be connected to a signal multiplexing unit that may provide signal conditioning and routing, and the multiplexing component may be connected to a sensor data processing subsystem that includes a computer software component that may be located in the vehicle's 100 central computer. The sensor system also may include a sensor data storage system comprised of digital storage components that may allow for real time data collection and for latent data processing. The system may categorize stored data by a number of attributes that may include time of capture, device, and data type.

Still referring to FIGS. 1 and 2, the vehicle body 105 may scale proportionally in three dimensions. The vehicle body 105 according to an embodiment of the present invention may advantageously have a length scaling from about 2 feet to 70 feet, a beam from about 10 inches to 15 feet, and a depth of about 4 inches to 5 feet. The vehicle body 105 according to an embodiment of the present invention can advantageously range in weight from about 5 pounds to 15,000 pounds. Alternate references of the vehicle body 105 in this disclosure are not meant to be limiting in any way. More particularly, any reference to dimensions above is meant for exemplary purposes, and not meant to be limiting in any way.

The vehicle body 105 may be constructed of various materials, including fiberglass, carbon fiber, or aramid fiber, depending on the relative importance of prevailing design factors. For example and without limitation, if lowering construction costs of the unmanned vehicle 100 is an important design factor, the choice of fiberglass as the material for the vehicle body 105 may reduce the total cost to manufacture the unmanned vehicle 100. In another example and without limitation, if an important design factor is enhancing strength to weight characteristics in the vehicle body 105 for the unmanned vehicle 100 to withstand ambient air pressures during aerodynamic flight or glide as well as to withstand ambient water pressures when submerged in water to hundreds of feet, the choice of aramid fiber as the construction material for the vehicle body 105 may be desirable. Those skilled in the art will appreciate, however, that the unmanned vehicle 100 according to an embodiment of the present invention may be constructed of any material, and that the materials mentioned above are exemplary in nature, and not meant to be limiting. According to an embodiment of the present invention, a vehicle body 105 constructed of disclosed materials less than 0.125 inches thick may exhibit a high tensile strength to counter the pressures at hundreds of feet under water as well as to support a controllable low pressure differential across the exterior of the vehicle body 105 during atmospheric flight.

Figure 4:
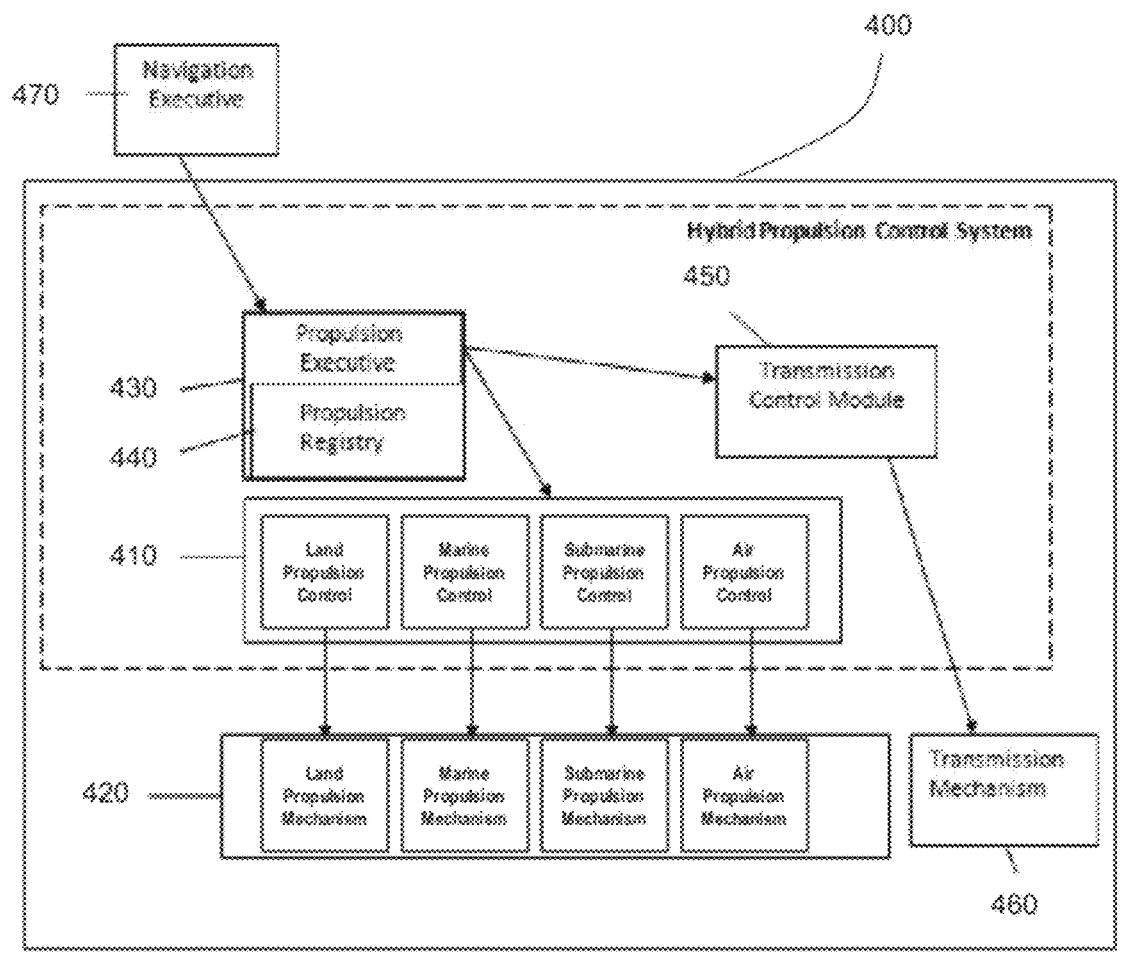
FIG. 4 is a schematic overview of a propulsion control system of an unmanned vehicle according to an embodiment of the present invention.

Referring now to FIG. 4, a propulsion system 400 of the unmanned vehicle 100 according to an embodiment of the present invention will now be discussed. The propulsion system 400 may include a combination of propulsion control modules 410 and propulsion mechanisms 420 that may, either autonomously or in response to remote controls, propel the unmanned vehicle 100 on land, in the air, on the surface of the water, and underwater. The propulsion mechanisms 420 may employ vectored thrust mechanisms that may, for example and without limitation, include turbines and propellers.

Still referring to FIG. 4, the propulsion system 400 may include a propulsion executive 430, a propulsion registry 440, and a transmission control module 450. The propulsion executive 430 may accept instructions for speed and propulsion type from the navigation executive 470, and may send control signals to direct the desired propulsion mechanisms 420 to engage using the transmission mechanism 460. The instructions to the propulsion executive 430 from the navigation executive 470 may be in the form of relative changes to speed, including the ability to reverse direction, as well as to the mode of propulsion. Several different types of propulsion systems are contemplated for use in connection with the unmanned vehicle 100 according to embodiments of the present invention. Details regarding the several different types of propulsion systems are provided below.

Figure 5:
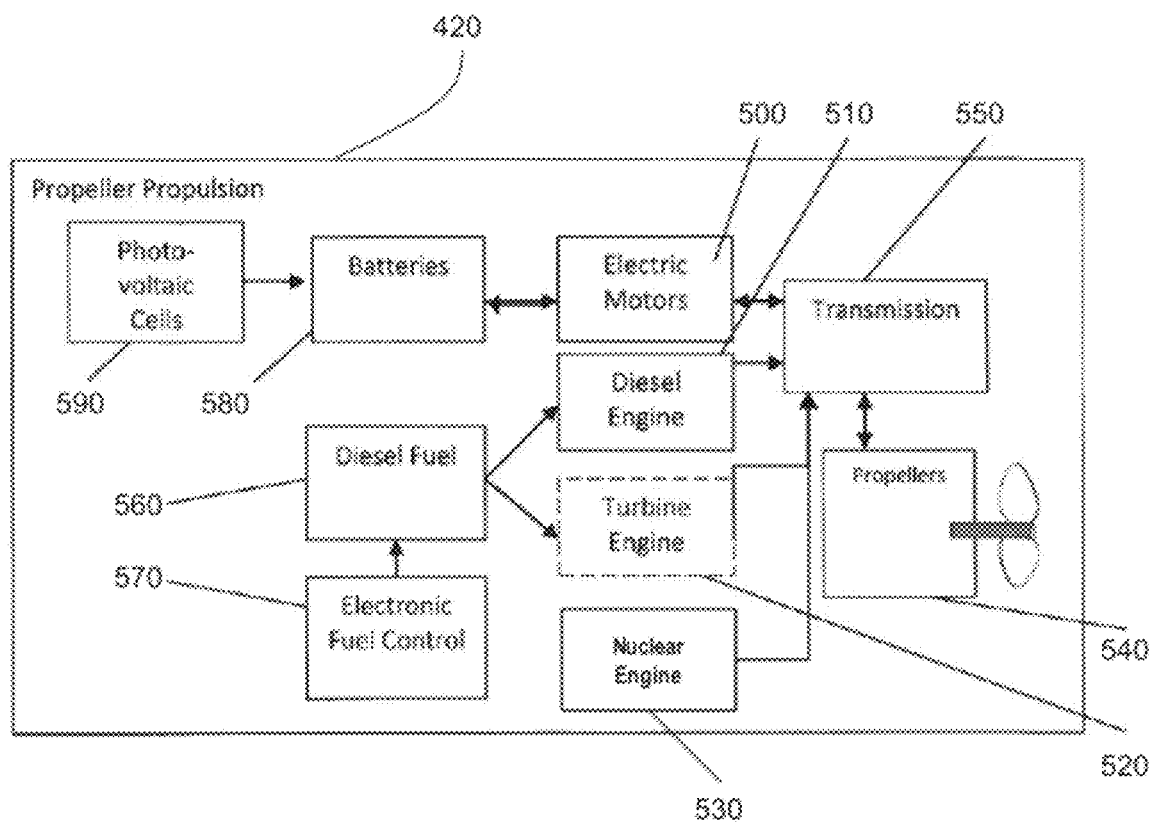
FIG. 5 is a schematic overview of a propulsion system of an unmanned vehicle according to an embodiment of the present invention suitable for marine and submarine use.

Referring now to FIG. 5, an example propulsion mechanism 420 of the unmanned vehicle 100 according to an embodiment of the present invention is discussed in greater detail. Power supplies for all modes of use of the unmanned vehicle 100 may, for example and without limitation, include a variety of motors such as electric 500, diesel 510, turbine 520, and nuclear 530. Embodiments of the unmanned vehicle 100 according to the present invention may include all or some subset of the hybrid power sources disclosed.

Still referring to FIG. 5, in some embodiments of the present invention the unmanned vehicle 100 operating in marine and submarine modes may use a plurality of propellers 540 or water jets as vectored thrust. Power may be supplied to propellers 540 by electric motors 500 or by diesel 510, turbine 520, or nuclear 530 engines through a computer-controlled transmission 550. A turbine engine 520 may be substituted for the diesel engine 510. The diesel 510 and turbine 520 engines may be fueled by, for example and without limitation, common diesel fuel 560, kerosene, and jet-x. The propulsion control system may include an electronic fuel control 570 to regulate the fuel supplied to the diesel 510 and turbine 520 engines.

Still referring to FIG. 5, the unmanned vehicle 100 according to embodiments of the present invention may make use of energy captured in storage cells such as batteries 580. Such storage cells, for example and without limitation, may include high power density lithium polymer batteries or lithium ion batteries. The storage cells may receive energy from the electric motors 500 running as generators when the unmanned vehicle 100 is under power from another source such as diesel 510, turbine 520, or nuclear 530 engines. In another embodiment, the storage cells may receive energy from photovoltaic cells 590 that may be mounted to the vehicle body 105 in a variety of mechanical configurations. Such mounting configurations, for example and without limitation, may include axial hinges with actuators to articulate the photovoltaic cells 590 outwardly from the vehicle body 105. In one embodiment, the photovoltaic cells 590 may be wired to a computer-controlled power control and regulator module. A computer-controlled switch in the power control module may route power from the photovoltaic cells 590 to sets of batteries 580 for recharge depending on the relative charge state of the batteries 580. The regulator module may monitor and adjust the charge to the batteries 580 used in the first unmanned vehicle 100 embodiment. For example, and without limitation, another embodiment of battery 580 recharge may utilize wave motion to accomplish a low level recharge by mounting a faraday tube along the fore-to-aft axis of the vehicle body 105. The faraday tube may be electrically connected to power lines in communication with batteries 580 through a regulator.

Figure 6:
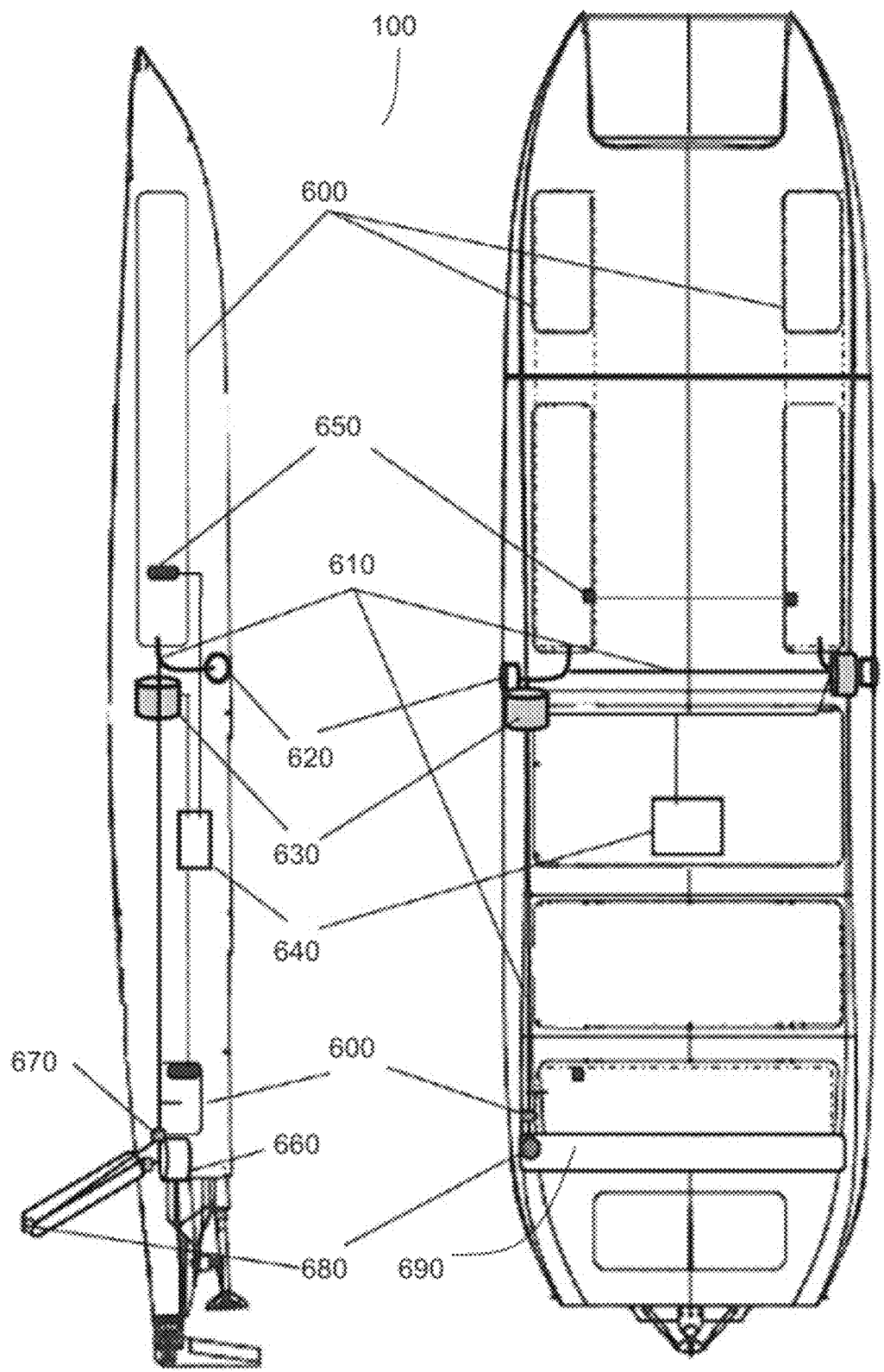
FIG. 6 is a side elevation view and a bottom plan view of a ballast system of an unmanned vehicle according to an embodiment of the present invention.

Referring now to FIG. 6, the ballast system of the unmanned vehicle 100 according to an embodiment of the present invention will be discussed. The ballast system, for example and without limitation, may contain mechanisms to control the volume of water and air in one or more ballast chambers 600 to advantageously vary the buoyancy of the unmanned vehicle 100 while submerged and to support selective submerging and re-surfacing of the unmanned vehicle 100. The ballast system may also be known as the buoyancy system because the system may provide for the selective submerging and re-surfacing of the unmanned vehicle 100 by varying buoyancy. The ballast control mechanism may comprise piping 610 and ports 620 to enable the flow of water into and out of ballast chambers 600. Electric water pumps 630 may be activated by the ballast control system 640 to control ballast levels which may be monitored by ballast sensors 650. A pressure tank 660 may be vented into the ballast chamber 600 and the air flow between the pressure tank 660 and the ballast chamber 600 may be regulated by locking electronic valves 670 that may be controlled by the ballast control system 64. The pressure tank 660 may enable fast evacuation of the ballast chamber 600 and also evacuation of the ballast chamber 600 when other means are not available rapidly.

Ballast ports 680 may be located on the bottom surface of the vehicle body 105 which may enable water to be fed into the ballast tanks 600 when the unmanned vehicle 100 is in motion, which may enable fast submersion. A ballast port 680 located on a device rack 690 positioned on the top of the vehicle body 105 may enable water to be routed into the ballast chambers 600 when the unmanned vehicle 100 is in a top-down position in the water. Filling the ballast chambers 600 while top-down may advantageously enable the unmanned vehicle 100 to autonomously self-right, both at or below the surface of the water. In another embodiment, for example and without limitation, a ballast port 680 located on a device rack 690 may allow routing of air or water to the ballast chambers 600 and, in so doing, may allow the unmanned vehicle 100 to operate underwater without fully surfacing, which may be advantageous for stealth objectives.

Figure 7:
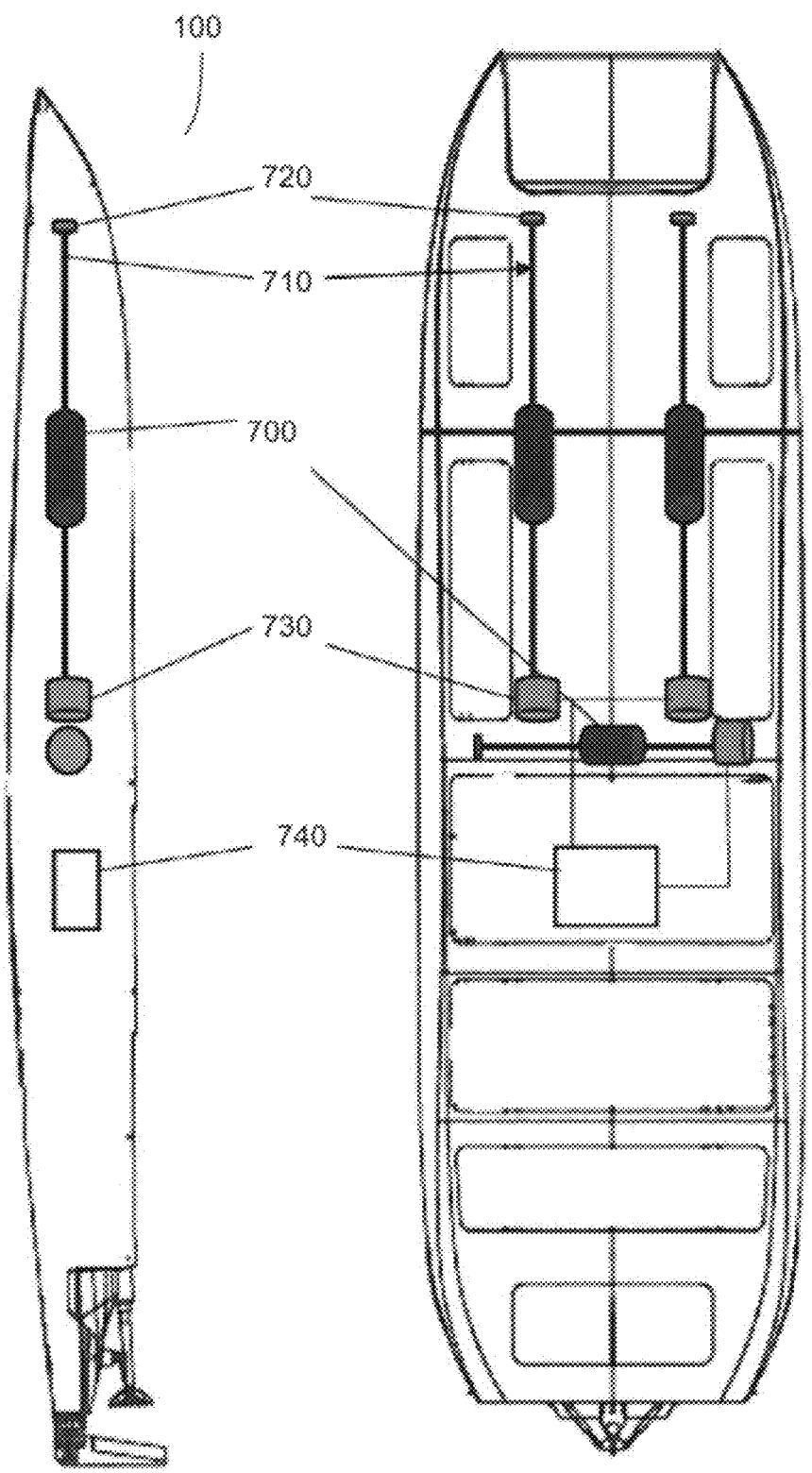
FIG. 7 is a side elevation view and a top plan view of an adjustable center of gravity system of an unmanned vehicle according to an embodiment of the present invention.

Referring now to FIG. 7, the center of gravity system of the unmanned vehicle 100 according to an embodiment of the present invention will be discussed. The center of gravity system, for example and without limitation, may include mechanisms to control the center of gravity of the unmanned vehicle 100 along the two perpendicular axes for roll and pitch. The center of gravity control system may include internally threaded weights 700 which may encase threaded actuator rods 710 that may be fixed to rotational bearings 720 on one end and electric motor actuators 730 on the other. The electric motor actuators 730 may be controlled by the center of gravity control system 740 that supplies power and signal to the electric motors. Sensors on the linear actuators provide feedback to the center of gravity control system 740 as to position and speed of motion of the controlled, internally threaded weights 700.

Figure 8:
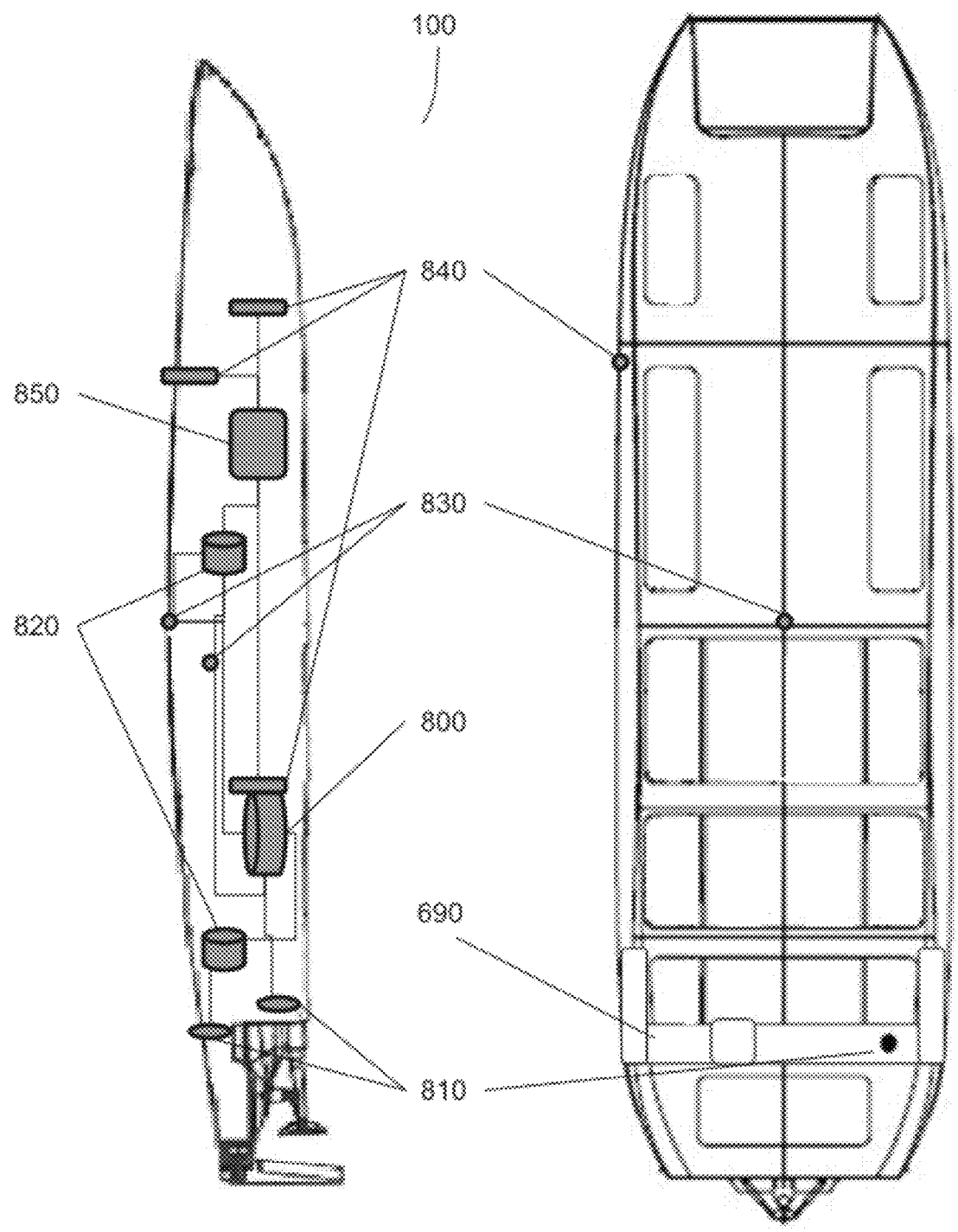
FIG. 8 is a side elevation view and a top plan view of a pressurization system of an unmanned vehicle according to an embodiment of the present invention.

Referring now to FIG. 8, the pressurization system of the unmanned vehicle 100 according to an embodiment of the present invention will be discussed. The pressurization system, for example and without limitation, may contain a pressure tank 800 that may be able to hold gaseous material, such as air, at a minimum gas pressure of 500 PSI with a sealed hull of an unmanned vehicle 100 to advantageously enable vehicle body 105 strength-to-weight characteristics during selective operation of the unmanned vehicle in the air, on the surface of the water, and below the surface of the water. In one embodiment, the pressure tank 800 may be carried within a compartment inside the vehicle body 105. In another embodiment, the pressure tank 800 may be affixed to the inside of the sealed hull of the vehicle body 105 which itself defines a watertight chamber. Bidirectional seals in the sealed hull may be applied to any openings, vents, ports, and moving services carried by the vehicle body 105 to maintain a pressurizable space within the unmanned vehicle 100.

Still referring to FIG. 8 in a further embodiment, for example and without limitation, pressurized spaces within the vehicle body 105 may vent 810 via piping to the exterior of the vehicle body 105. In one embodiment, for example and without limitation, the piping lines may be vented to the vehicle body 105 exterior through the device rack 690. In a further embodiment, for example and without limitation, an electrically-actuated air pump 820 capable of transferring air into the pressure tank 800 may be connected to an air port via piping line that may employ locking electronic valves 830 to regulate the intake of air through an air port and into the pressure tank 800.

Still referring to FIG. 8 in a further embodiment, a locking electronic valve 830 that is in the "normally closed" position may be connected to a piping line that may connect to the pressure tank 800 and may vent 810 inside the vehicle body 105. In a further embodiment, for example and without limitation, a locking electronic valve 830 that is in the "normally closed" position may be connected to a piping line that may vent 810 air from inside the vehicle body 105 to the vehicle body 105 exterior. All internal compartments in the unmanned vehicle 100 may be connected via piping lines to both external vents 810 or to internal vents between compartments.

Continuing to refer to FIG. 8, pressure sensors 840 may be affixed inside the vehicle body 105 and external to the hull of the vehicle body 105, and may send internal and ambient pressure information to the pressurization control system 850. The pressure control system 850 may be a set of software programs running on a set of microprocessors that may have control algorithms that may receive inputs from the sensors 840 previously mentioned, may calculate the differential pressure, and may produce outputs to the pressure valve 830 actuator and the air pump 820. The navigation control system may contain logic that may determine the optimal pressure differential set point and may send this information in the form of digital instructions across a computer network to the pressurization control system 850. The pressure control logic may send control signals to actuator controllers that operate the air pump 820 and relief valve 830.

To increase the internal pressure in a pressurized compartment inside the vehicle body 105, the pressure relief valve 830 from the pressure tank 800 may be opened. To decrease the internal pressure in a pressurized compartment inside the vehicle body 105, the pressure relief valve 830 between the compartment inside the vehicle body 105 and the environment external to the vehicle body 105 may be opened. In both cases, a control algorithm in the pressurization control system 850 may determine the frequency and duration of opening and closing the pressure valves 830.

A pressure sensor 840 may monitor the pressure tank 800 and may send this signal periodically to the pressure control system 850. When the pressure in the pressure tank 800 may fall below a given level, as may be configured in the pressure control system 850 logic, the pressure control system 850 may issue a request to pressurize to the navigation system which, in turn, may issue a request to pressurize to the off board mission control and on board control system master. These systems may have logic and configurations that may determine when pressurization may be authorized. When pressurization is authorized, instructions are sent to the pressurization system to pressurize.

Figure 9:
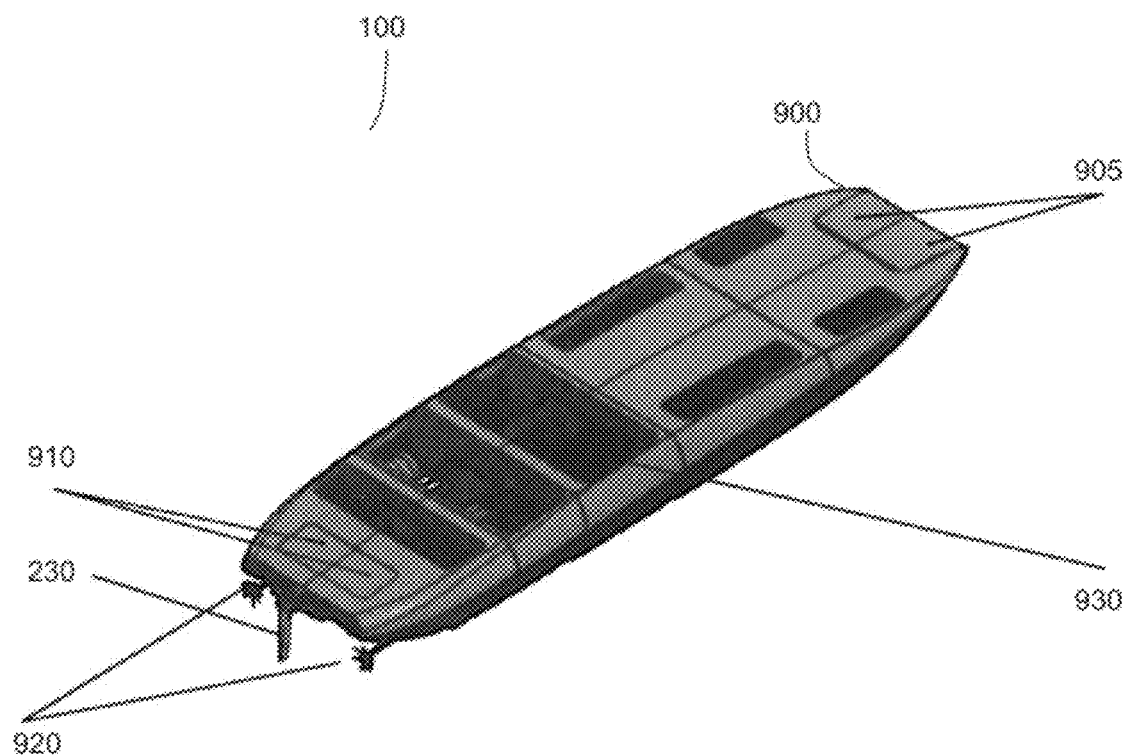
FIG. 9 is a solid model perspective view of control surfaces of an unmanned vehicle according to an embodiment of the present invention.
Figure 10:
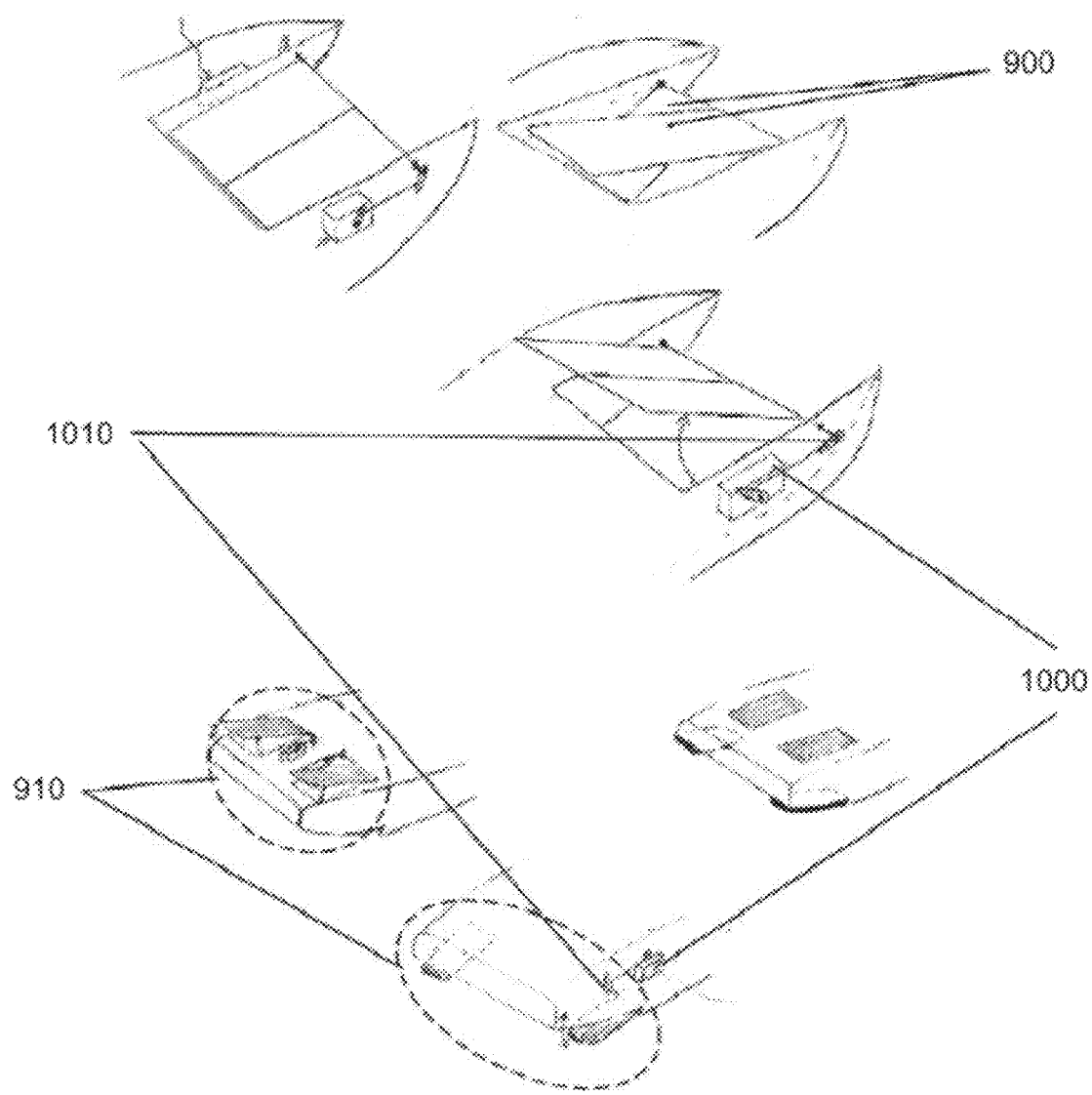
FIG. 10 is a plurality of partial perspective views of control surfaces of an unmanned vehicle according to an embodiment of the present invention.

Referring now to FIGS. 9 and 10, the control surfaces 900 of the unmanned vehicle 100 according to an embodiment of the present invention will be discussed. In one embodiment of the present invention, control surfaces 900 may be affixed to the vehicle body 105 to advantageously support physical maneuvering of the unmanned vehicle 100 in the air, on the surface of the water, and below the surface of the water. The control surfaces 900, for example and without limitation, may be comprised of forward canards 905, rear trim plates 910, and rudders 230, all of which may be affixed externally to the vehicle body 105. In one embodiment, for example and without limitation, a rudder 230 may be mounted on a strut that may be positioned substantially near the stern of the vehicle body 105. The unmanned vehicle 100 may also include propeller thrusts 920 which may be vectored.

Still referring to FIGS. 9 and 10, electronic position sensors 1010 may be attached to each control surface 900 and position signals may be relayed to the control surface control system 930, which may apply control logic to determine desired control surface 900 adjustments. In one embodiment, each of the control surfaces 900 may be independently articulated by electric motor actuators 1000 in response to control signals received by that control surface 900 from the control surface control system 930. For example and without limitation, the front canards 905 may articulate independently in two directions for a maximum roll condition, and the rear trim tabs 910 may also articulate bidirectionally.

Figure 11:
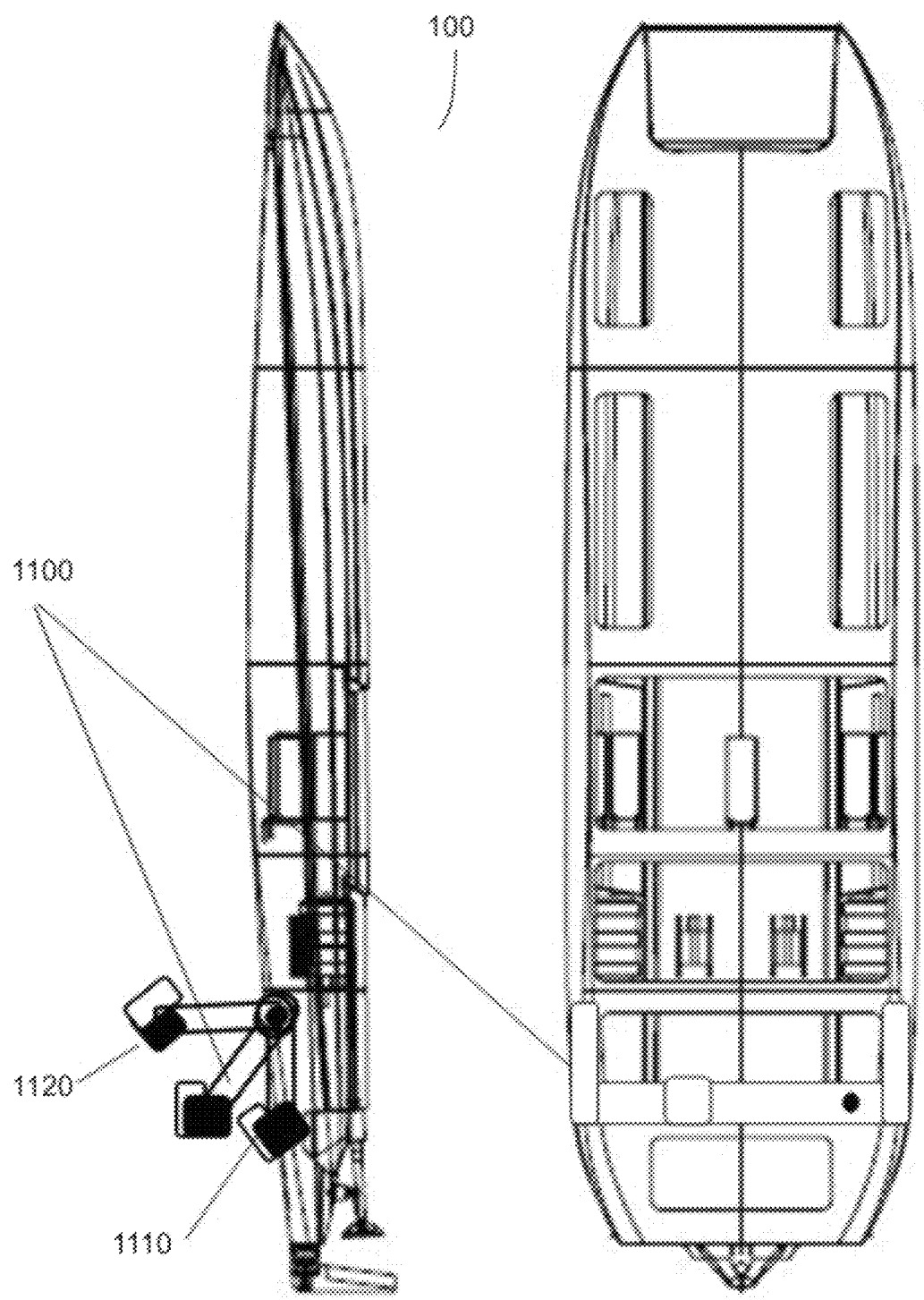
FIG. 11 is a side elevation view and a top plan view of a retractable device rack of an unmanned vehicle according to an embodiment of the present invention.
Figure 12:
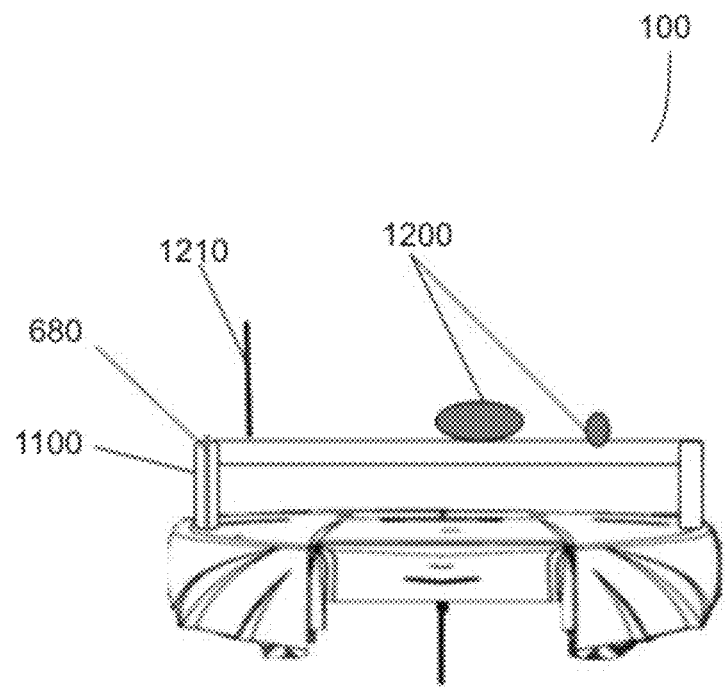
FIG. 12 is a front elevation view representing a retractable device rack of an unmanned vehicle according to an embodiment of the present invention showing the retractable device rack in an extended position.

Referring now to FIGS. 11 and 12, the device rack of the unmanned vehicle 100 according to an embodiment of the present invention will be discussed. The device rack, for example and without limitation, may include a retractable mount 1100 that may articulate from the vehicle body 105 and that may hold sensors 1200, communication antennae 1210, and a ballast port 680. In one embodiment, for example and without limitation, mounting points including mechanical, power and signal mounts may be provided at the device rack for sensors 1200 and communication antennae 1210. In another embodiment, ballast ports 680 may be located on either side of the retractable mount 1100, to which electric wiring and ballast piping may be routed from inside the vehicle body 105 through pressure sealed bulkheads. The device rack may be constructed of various materials including, for example and without limitation, aramid fiber as an outer cover which may be disposed over an aluminum tube frame.

Still referring to FIG. 11, in one embodiment, for example and without limitation, the device rack may be actuated by electric motors under computer control such that the device rack can be retracted into a "down position" 1110 which may present the least drag and visibility of the unmanned vehicle 100. In another embodiment, for example and without limitation, the device rack may be actuated by electric motors under computer control such that it can be extruded into a full "up position" 1120 which may present better surveillance, communication, and ballast reach. In one embodiment, for example and without limitation, the retractable mount 1100 may be actuated in the form of a lever arm that may, to accomplish articulation and retraction, swing rotationally about a hinge that may be fixed at a mount point located substantially adjacent to the surface of the vehicle body 105. In another embodiment, for example and without limitation, the device rack may be actuated in the form of a telescoping member that may extrude and retract in a vector substantially perpendicular to the member's deployment point on the surface of the vehicle body 105.

Figure 13:
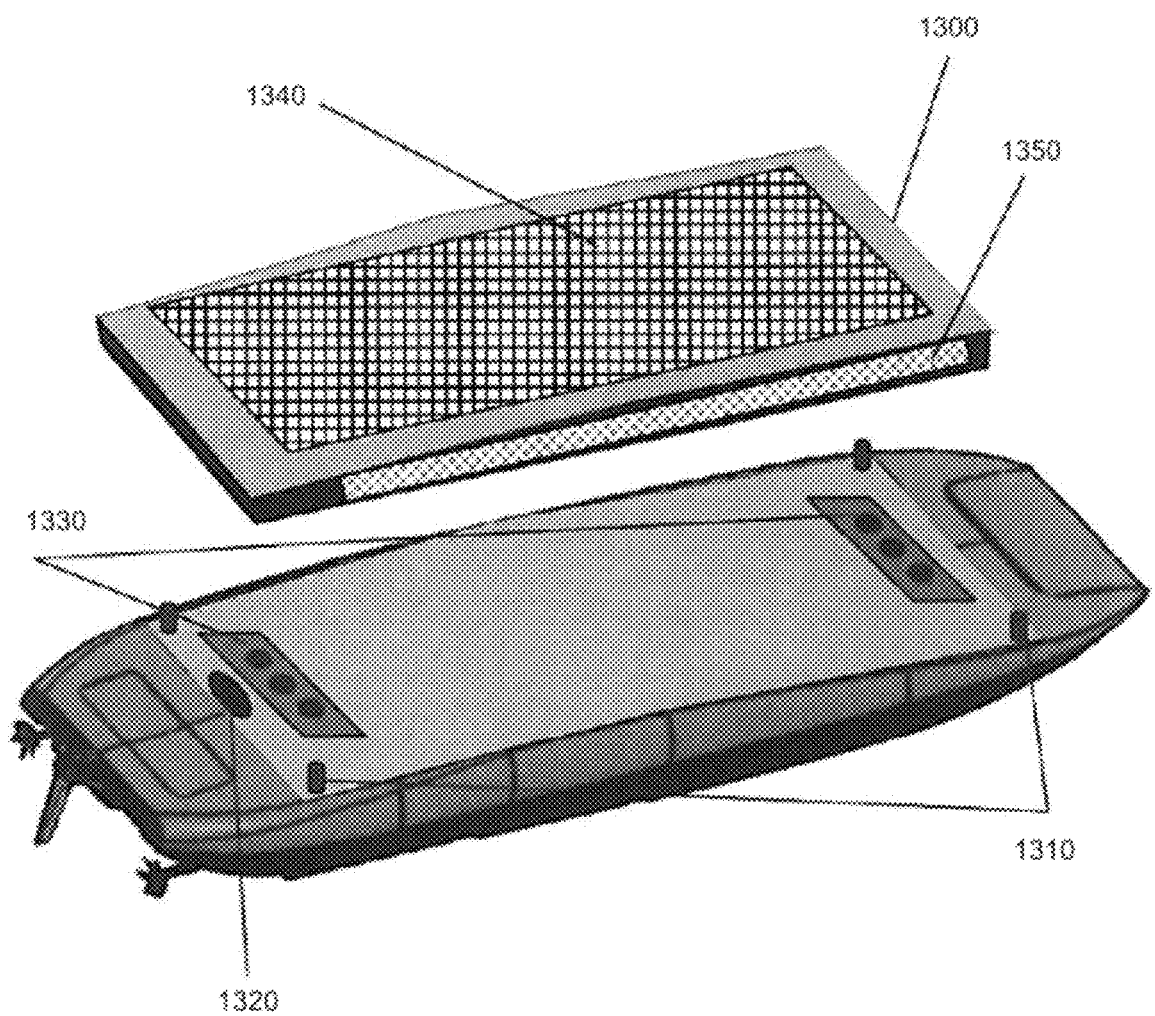
FIG. 13 is an exploded perspective view of an interchangeable payload deck of an unmanned vehicle according to an embodiment of the present invention including a solar panel payload module.

Referring now to FIG. 13, the payload deck of the unmanned vehicle 100 according to an embodiment of the present invention will be discussed. The payload deck, for example and without limitation, may provide mounting points for an interchanging payload deck 1300. In one embodiment, the mounting points may include mechanical mounting mechanisms 1310, power connections 1320, and signal connections 1330. Connections and mount points may be fully, hermetically sealed for underwater operation of the unmanned vehicle 100. The vehicle body 105 may be itself fully sealed and may operate without a payload deck. In one embodiment of the present invention, a payload deck may carry auxiliary solar panels 1340 for electrical recharge, and may contain flat form factor batteries 1350 that may provide auxiliary power which may advantageously extend the operational duration of the unmanned vehicle 100.

Figure 14:
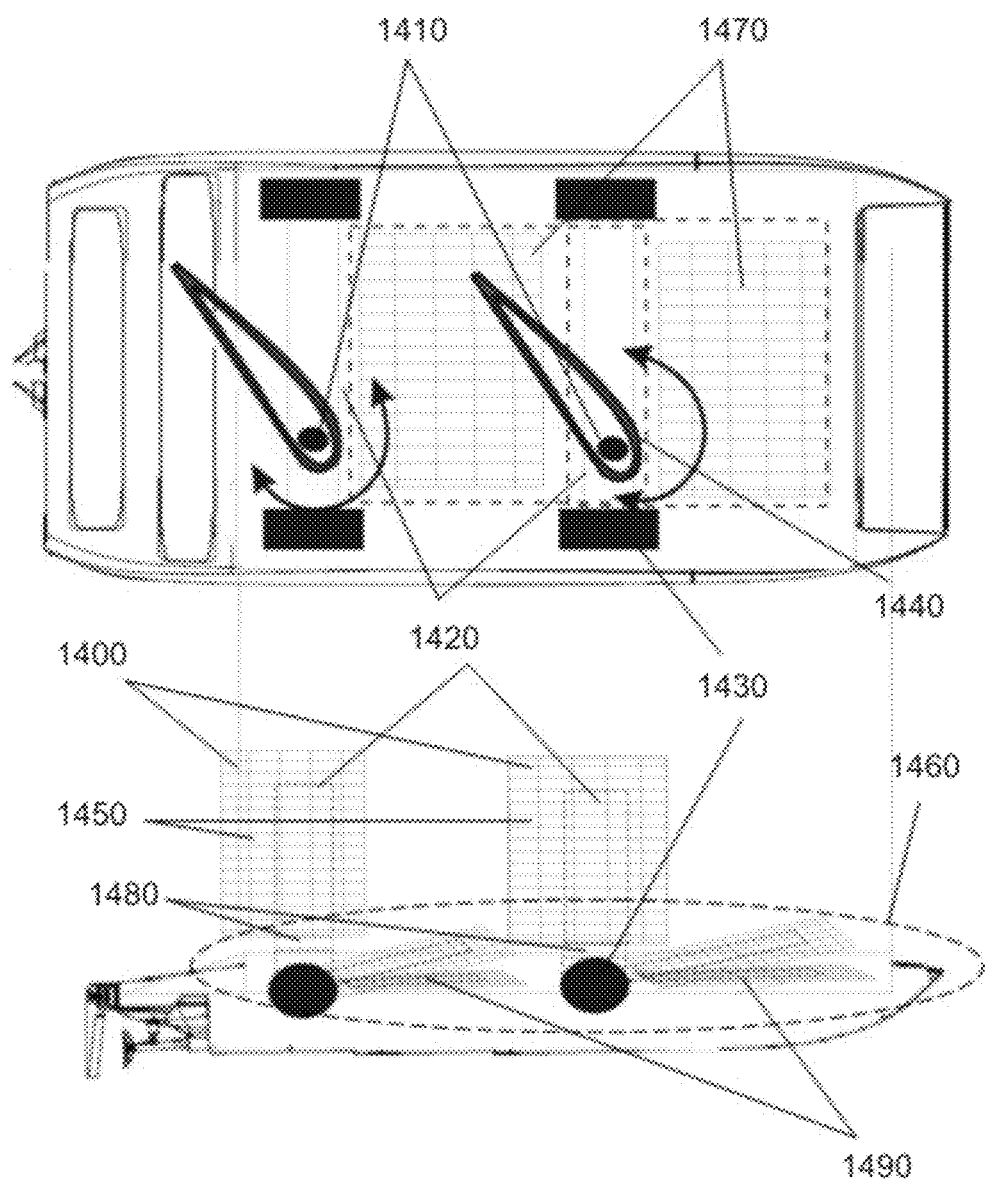
FIG. 14 is a top plan view and a side elevation view of an interchangeable payload deck of an unmanned vehicle according to an embodiment of the present invention including a wind sail payload module.

Referring now to FIG. 14, the payload deck, for example and without limitation, may provide mechanical, power, and signal connectivity for an additional form of propulsion that may be supplied by a retractable hard sail affixed to an interchangeable payload module. In one embodiment, for example and without limitation, two hard wing sails 1400 with central masts 1410 may be mounted on horizontal cylinders 1420 that may rotate and may be driven by electric motor actuators 1430. The hard wing sails 1400 may have an aerodynamic wing shape 1440 that may provide additional lift when the unmanned vehicle 100 sailing upwind on the surface of the water. The hard sails 1400 may be rotated around the axis of their mounting mast 1410, which may be accomplished by splitting the masts 1410, articulating the sections independently, and mounting electric motor actuators 1480 between mast sections 1410. The hard sails 1400 can be rotated in two axes and stowed in the payload bay in a horizontal position 1490. Position sensors may be mounted on the actuators between mast sections 1410 that may be connected to the navigation control system through a wiring connection that may run through bulkhead connectors between the payload deck and the vehicle body 105.

Still referring to FIG. 14, for example and without limitation, solar panels 1450 may be affixed to the outer surfaces of the hard sails 1400 which may provide solar recharge capability. The solar panels 1450 may be connected to the payload electrical system which may be connected to the vehicle electrical power system through a bulkhead connector between the payload deck 1460 and the vehicle body 105. Additional solar panels 1470 may be mounted in the bed of the payload deck for additional solar energy collection and also may be connected to the vehicle electrical power system. In other embodiments, the payload deck, may provide mechanical, power, and signal connectivity for payload modules that may provide auxiliary capabilities in the form of, for example and without limitation, wind energy collectors, video surveillance, and weapons systems. In one embodiment, the navigation control system may be put in a "maximum endurance" mode which may comprise executing algorithms to exploit the most efficient use of the propulsion systems the vehicle 100 has on board. In a preferred embodiment for endurance, such a configuration may include wind sail propulsion 1400, current propulsion, underwater glide propulsion, and solar recharge 1450. In this configuration, the time endurance of the unmanned vehicle 100 may be virtually unlimited from a motive power standpoint. For example, and without limitation, water current may be determined from maps and algorithms, and sensors for wind speed and direction may be activated and data collected. The navigation control system may be configured with algorithms to choose the most effective path segments and overall plan for minimum energy consumption. For example, and without limitation, if the vehicle 100 is proximate to an ocean current moving from west to east and also a prevailing wind moving in about the same direction, the navigation control system may choose a path to tack up wind generally in a westerly direction, then ride the current in an easterly direction without aid of wind to maximize the time of the path on current propulsion. Additionally, mission control system algorithms (as described below) may determine that underwater glide mode is the most desirable mode with the current for surveillance reasons. In this case, the unmanned vehicle 100 may sail east to west on the surface, then glide underwater west to east. In this mode of operation, very little energy may be consumed and, with solar recharge 1450, the unmanned vehicle may actually experience a net gain in energy over this path.

Figure 15:
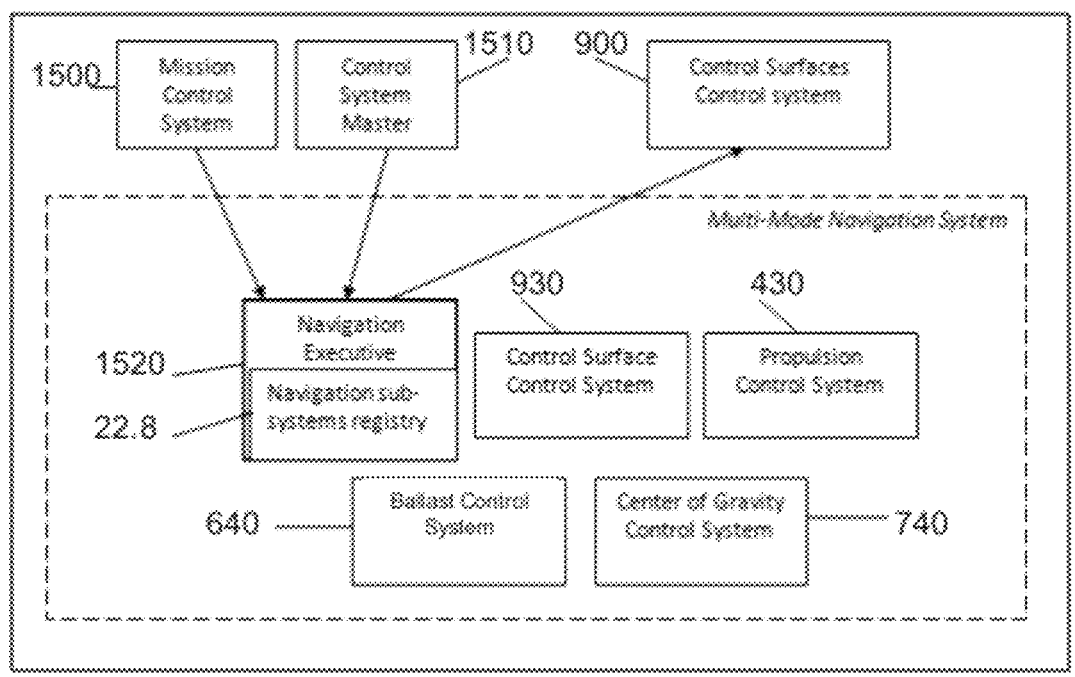
FIG. 15 is a schematic overview of a multi-mode navigation control system of an unmanned vehicle according to an embodiment of the present invention.

Referring now to FIG. 15, the navigation control system of the unmanned vehicle 100 according to an embodiment of the present invention will now be discussed. The navigation control system, for example and without limitation, may act as the on board governor of the speed, direction, orientation, mode and propulsion type for operation of the unmanned vehicle 100. In an embodiment, for example and without limitation, the navigation control system may order functional responses from a navigation executive 470, control surfaces 900 and control surfaces control system 930, propulsion executive 430, ballast 640, and center of gravity 740 subsystems. The multi-mode navigation control system may enable the unmanned vehicle 100 to operate on land, on the surface of the water, submerged under water, and in controlled glide or flight in the air by coordinated computer control of the vehicle control surfaces 900, ballast 640, center of gravity 740 and mode of propulsion 430 according to logic and sensor input that may be matched to the operating environment in which the unmanned vehicle 100 may be operating. The computer-controlled subsystems for each control activity may be connected in a computer network which may enable communication between each control subsystem and coordination by a control executive. For example, and without limitation, the present invention may achieve controlled navigation and vehicle 100 orientation in multiple modes. This capability may be exemplified by the ability to maintain direction and stability at speeds of typically between 100 to 200 knots on the surface of the water; orientation and depth control underwater, and controllable glide and flight paths in the air. The ability to control navigation and vehicle 100 orientation in multiple modes may be achieved by autonomous computer control of vehicle control surfaces 930, ballast control 640, and vehicle center of gravity control 740. The control systems of all three of these elements may themselves be under coordinated control by the multi-mode navigation control system. Further, the multi-mode navigation control system may control propulsion 400 which also may affect vehicle 100 orientation in combination with the other navigation systems. The systems that control these elements may employ computer-controlled actuators and feedback sensors for closed loop real-time control. For example, and without limitation, the multi-mode navigation control system may include optimization instructions regarding speed and orientation. The orientation control function of the navigation control system may calculate the optimal changes in control surfaces 900 and center of gravity and may send instructions to the navigation executive which issues instruction to the control surface control system 930 and the center of gravity control system 740. The velocity control module of the navigation control system may calculate propulsion required and may send the signal to the propulsion control system 430 via the navigation executive 1520. The flight control function of the navigation control system may enable powered flight and aerodynamic gliding. Also for example, and without limitation, the mission control system 1500 may send instructions to the navigation executive 1520 of the multi-mode navigation control system to initiate a mission segment that has an environmental mode of "air glide to water entry." The navigation executive 1520 may, in turn, send instructions over a computer network or internal computer bus to activate the flight control system and to prompt other navigation systems to become slaves to the flight control system. The flight control system may monitor sensor input for altitude, orientation (e.g., roll, pitch, yaw) and speed, and may send control instructions to the control surfaces control system 930 and the center of gravity control system 740. The flight control system may store parameters for optimal orientation and speed characteristics of the vehicle 100, and also logic to operate the control surfaces 900 and center of gravity accordingly. Altitude and infrared sensor input may be fed to the navigation executive that indicates approach to the water surface. As this approach occurs, the navigation executive 1520 may issue new instructions to flight control system as to optimal orientation for entering the water, and the flight control system may issue instructions based on stored logic to the control surfaces 930 and center of gravity control 740 systems to achieve the optimal vehicle 100 orientation. Acceleration, temperature, and pressure sensor data may be fed to the navigation control systems that indicate water entry. When water entry occurs, the navigation executive 1520 may send instructions to the flight control system to shutoff and may initiate logic for underwater operation that determines characteristics to achieve stable orientation underwater. Instructions may be sent to the control surfaces 930, center of gravity 740, and ballast control 640 systems. Also, the navigation executive 1520 may send an electronic message over the computer network to the mission control system notifying it that the vehicle 100 has entered and is under the water. The mission control system may store information that indicates the next mission segment, and also logic to translate the segment information into environmental mode of operation, speed, orientation, direction and duration. The mission control system then may send instructions pertaining to navigation characteristics of the next segment back to the navigation executive 1520. For example, and without limitation, the next segment may be water surface operation at 15 knots with a specified directional heading. The navigation executive 1520 may execute logic for surfacing that includes instructions to the control surfaces 930, ballast 640, and center of gravity 740 systems. Depth, pressure, temperature and directional sensor input may be fed to the navigation executive 1520 and, as the vehicle 100 surfaces, the navigation executive 1520 may select the propulsion mode and may initiate propulsion according to configuration parameters stored in computer memory. Speed and direction instructions may be issued by the navigation executive 1520 to the propulsion control system 400 and control surfaces control system 930. Each of these systems may accept sensor inputs, and the propulsion system 400 may control the propulsion mechanisms to the determined speed, and the control surfaces control system 930 may operate the control surfaces 900 to achieve the instructed orientation.

Still referring to FIG. 15, in one embodiment, navigation directives may originate from a mission control system 1500 when all systems may be operating normally, or from the on board master control system 1510 in the event of an exception condition, for example, if the mission control system 1500 may be not operating reliably or if a critical subsystem may be operating abnormally. The navigation executive 470 may translate instructions for consumption by each subsystem. The navigation executive 470 includes a navigation sub-systems registry 1520 by which it may register and store information about the navigation subsystems that may be available on the unmanned vehicle 100, including the signal format and semantics by which instructions may be communicated to them.

Figure 16:
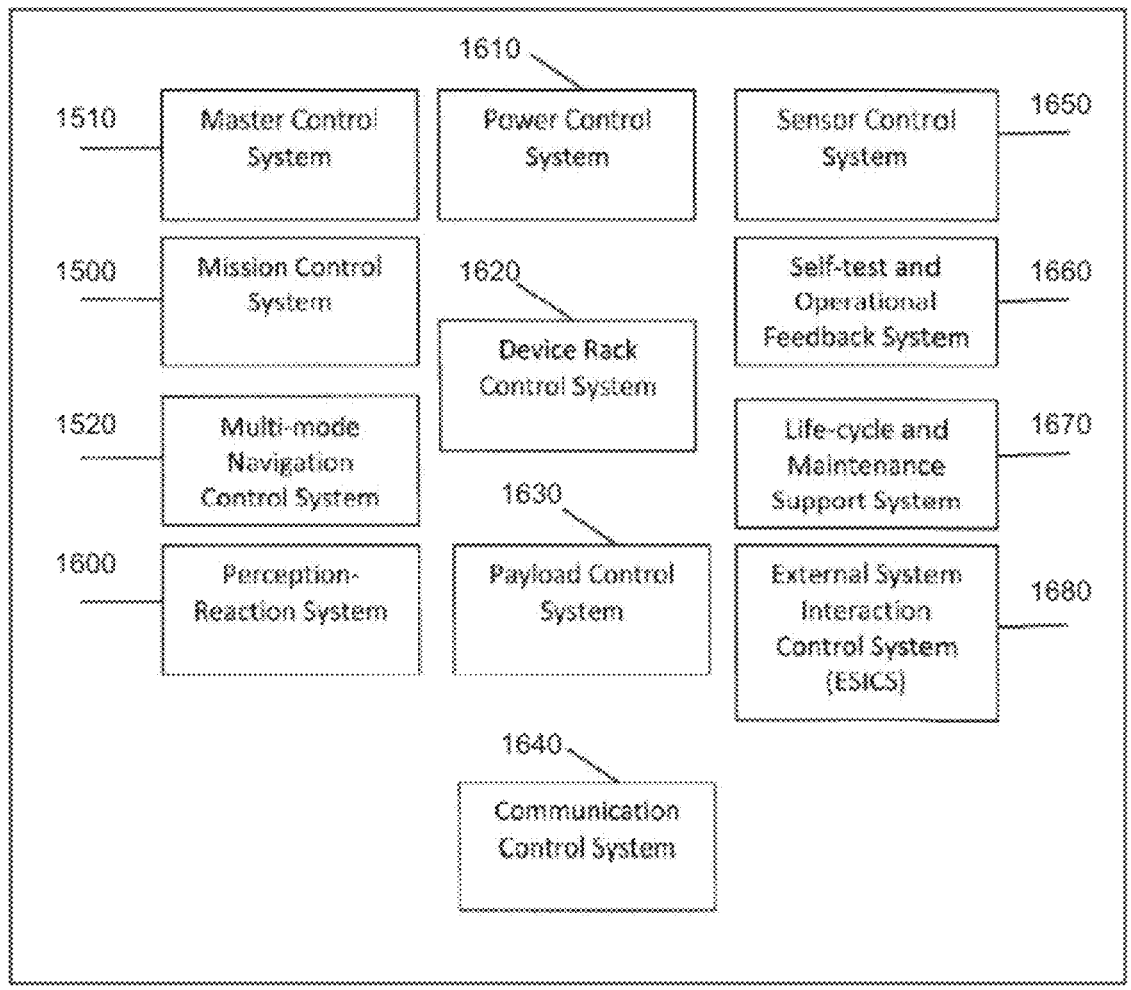
FIG. 16 is a schematic overview of an on board control system of an unmanned vehicle according to an embodiment of the present invention.

Referring now to FIG. 16, the on board master control system of the unmanned vehicle 100 according to an embodiment of the present invention will now be discussed. The on board master control system 1510, for example and without limitation, may exercise local authority over all command, control and communications related to operation of the unmanned vehicle 100. In one embodiment, for example and without limitation, on board master control system 1510 may interact with subsystems that may include a mission control system 1500, multi-mode navigation control system 1520, propulsion and power control system 1610, device rack control system 1620, payload control system 1630, communication control system 1640, sensor control system 1650, as well as a perception-reaction system 1600, self-test and operational feedback control system 1660, life cycle support and maintenance system 1670, and external system interaction control system 1680. The on board master control system 1510 may enable multi-mode operation, autonomous operation, and remote manual control of the unmanned vehicle 100.

In one embodiment, for example and without limitation, the on board master control system of the present invention may be comprised of software programs that may reside on computer storage devices and may be executed on microprocessing chips also referred to as central processing units (CPU). Inputs to these software control modules may originate as instructions that may be sent from other on board control systems, as instructions that may be generated from off board control systems and communicated to on board systems, and as sensor data input that the control programs may monitor. The output of the software control programs may be digital control signals that may be translated to electronic control signals that may be consumable by motor controlled actuators that may operate the mechanical components of the unmanned vehicle 100. Software control module outputs also may be connected to a computer network on the unmanned vehicle 100 and all control modules may be connected to a computer network on board the unmanned vehicle 100.

Figure 17:
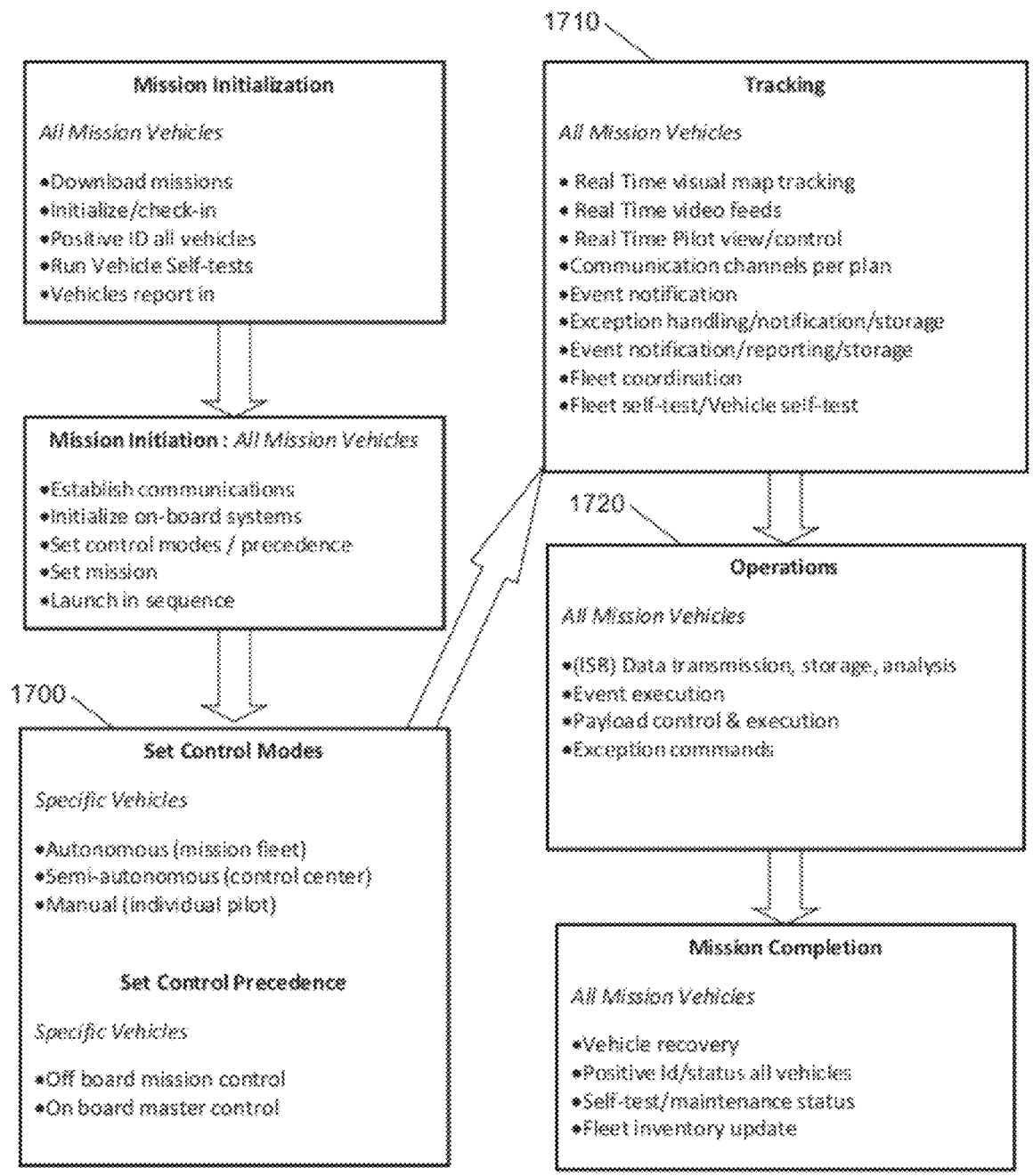
FIG. 17 is a flowchart of a mission control operation for an unmanned vehicle according to an embodiment of the present invention.

Referring now to FIG. 17, the off board mission control system of the unmanned vehicle 100 according to an embodiment of the present invention will now be discussed. The unmanned vehicle 100 of an embodiment of the present invention may, for example and without limitation, operate in full autonomy, partial autonomy or full manual control modes 1700. The on board mission control system may accept signals from an off board mission control system (also known as the Control System Master) that may indicate the degree of control, and may establish operation control of the unmanned vehicle 100 by enabling or disabling the required mission control logic. On vehicle initiation, the Control System Master may issue a startup command across a computer network to prompt the on board mission control system to perform self-test and operational feedback, and to send an on-line status back to the Control System Master. The on board mission system then may issue start up commands to all other on-board systems. Each system may start up, perform a self-test, and forward success or failure messages across the network to the Control System Master. The Control System Master may be configured 1700 to start up in autonomous or manual control mode, and also may be configured with a designator of the current mission. If in manual control mode, a ready signal may be sent to the Control System Master and the on board systems may await manual commands. If in autonomous control mode, the on board control system may be activated with the designator of the current mission and the Control System Master may hand off primary control to the on board control system. The Control System Master may be given back primary control if the on board control system aborts, is diagnosed as malfunctioning, or is over-ridden by manual control. The on board control system may be programmed with mission segments that define navigational, sensor, and payload operating characteristics in a time and logic sequence. The on board control system may issue continually updated instructions to vehicle subsystems as to course and speed (e.g., vector), mode of operation (air, water surface, subsurface), sensor data collection, stealth, payload operation, and interaction with external environments, events and entities. The on board control system may receive a continuous stream of data from sensors and may interrogate sensors for more granular data through instructions to the sensor system. The on board control system may issue higher level instructions to subsystems that are decomposed by the vehicle control subsystems into more specific instructions. This decomposition of more general instructions to more specific instructions may be a multi-level process that may result in specific signals consumable by vehicle devices and mechanisms. For example, the on board control system may issue an instruction to the navigation control system to navigate in a directional heading, within a speed range having maximum endurance. The navigation control system may execute logic and may, in turn, issue lower level instructions over the computer network to the subsystems it controls. The on board control system may also issue instructions to a power control system for maximum endurance; a perception-reaction system as to allowable reaction parameters; the device rack control system as to device rack orientation; the payload system as to current operational behavior; the communication control system as to channels and formats of communication; the sensor control system as to the environmental sensors to activate and the parameters for each as well as the sensor data to collect; and an external system interaction control system as to current behavioral attributes. All control subsystems may provide continuous status messages to the on board control system which may multiplex input status messages and may have logic to translate incoming message and sensor data into instructions back to the subsystems.

Still referring to FIG. 17, for example and without limitation, the off board mission control system may include functions to remotely manage individual unmanned vehicles 100. In one embodiment, real-time tracking 1710 and video feeds may allow remote operators to control specific unmanned vehicles 100 and to monitor the status of each unmanned vehicle 100 while in mission operation 1720. In another embodiment, human interfaces for remote operators of unmanned vehicles 100 in the form of graphical user interfaces (GUIs), for example and without limitation, may be displayed on human readable devices such as flat screen monitors, tablet devices, and hand held computer and smart phone devices.

Off board mission control databases and software programs may register, classify, and execute mission logic that may have inputs and outputs communicated to and from specific sets of unmanned vehicles 100 or individual unmanned vehicles 100. In one embodiment, the on board and off board systems that may collaborate to control one or more unmanned vehicles 100 may be linked through a common communication network protocol, for example and without limitation, internet protocol (IP). The common network protocol may be a communication layer that may work in combination with multiple transmission means that may include radio frequency (RF) and satellite microwave between on board and off board systems, as well as wired means such as Ethernet on wired networks. In a further embodiment, the off board systems may have databases and software programs that may operate in concert and on a shared network that may extend off board remote control of unmanned vehicle 100 sets.

In one embodiment, for example and without limitation, a communication network may enable the off board mission system to advantageously manage and control many unmanned vehicles 100 within communications range of the shared network. In a further embodiment, on board subsystems of many unmanned vehicles 100 may exchange data and digital signals and, in series, may relay those data and digital signals to an otherwise out of range off board control system, thereby advantageously extending the range of remote control and communication capability across a fleet of unmanned vehicles 100 which may result in coverage of larger operational areas with more unmanned vehicles 100 and fewer human operators.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

What is claimed is:

1. An unmanned vehicle comprising:
   an aerohydrodynamic vehicle body configured to selectively operate in air, on a substantially planar water surface, and while submerged in water, and wherein the vehicle body comprises:
   a wing having a leading edge, a trailing edge, a port edge, a starboard edge, an upper surface, and a lower surface; and
   a pair of substantially-parallel sponsons integrally coupled to the port and starboard edges of the wing, respectively, wherein each sponson is characterized by a proximal wall positioned adjacent the wing and a distal wall positioned opposite the proximal wall;
   wherein the proximal walls of the sponsons and the lower surface of the wing define therebetween a tunnel;
   wherein at least a portion of the vehicle body comprises at least one enclosed hull that defines at least one enclosed interior compartment capable of pressurization;
   a propulsion system carried by a portion of the vehicle body and configured to propel the unmanned vehicle;
   a ballast system carried by a portion of the vehicle body and configured to vary buoyancy of the unmanned vehicle;
   a center of gravity system carried by a portion of the vehicle body and configured to vary a center of gravity of the unmanned vehicle;
   a pressurization system carried by a portion of the vehicle body and configured to vary a pressure within the at least one enclosed interior compartment;
   at least one control surface system carried by a portion of the vehicle body and configured to maneuver the unmanned vehicle;
   a navigation control system carried by the vehicle body and configured to control a speed, an orientation, and a direction of travel of the unmanned vehicle;
   a sensor system carried by a portion of the vehicle body and comprising a plurality of environmental sensors configured to transmit environmental data and a plurality of operational sensors configured to transmit operational data;
   an on board mission control system carried by a portion of the vehicle body and comprising a rules engine configured to receive the environmental data and the operational data from the sensor system and to issue autonomous operational instructions retrieved from an on board data store to control operation of the propulsion system, the ballast system, the center of gravity system, the pressurization system, the at least one control surface system, and the navigation control system, wherein the autonomous operational instructions comprise air control instructions, marine control instructions, and submarine control instructions; and
   at least one power supply carried by a portion of the vehicle body and configured to provide power to the propulsion system, the ballast system, the center of gravity system, the pressurization system, the at least one control surface system, the navigation control system, the sensor system, and the on board mission control system;
   wherein the propulsion system, the ballast system, the center of gravity system, the pressurization system, the at least one control surface system, the navigation control system, and the on board mission control system are configured to execute the air control instructions to operate the vehicle body in the air, to execute the marine control instructions to operate the vehicle body on the surface of water, and to execute the submarine control instructions to operate the vehicle body below the surface of water.

2. An unmanned vehicle according to claim 1 wherein the sponsons are substantially longitudinally coextensive with the wing, the wing longitude being a distance from the leading edge to the trailing edge.

3. An unmanned vehicle according to claim 1 wherein the tunnel is open from the leading edge of the wing to the trailing edge of the wing, and is configured to receive a flow of fluid therealong.

4. An unmanned vehicle according to claim 1 wherein the sponsons have a stepped hull design.

5. An unmanned vehicle according to claim 1 wherein the wing and the sponsons are scalable proportionately to provide a vehicle body having a range of sizes including a small size defined as the wing and sponsons each having a longitudinal length of less than seven (7) feet and the unmanned vehicle having a weight of less than two hundred (200) pounds.

6. An unmanned vehicle according to claim 1 wherein the vehicle body comprises at least one compartment adapted to carry at least one of the propulsion system, the ballast system, the center of gravity system, the pressurization system, the at least one control surface system, the navigation control system, the sensor system, and the on board mission control system.

7. An unmanned vehicle according to claim 6 wherein the vehicle body comprises a hull; wherein the hull is a sealed hull provided by at least one pressure seal; and wherein an interior portion of the hull is pressurizable.

8. An unmanned vehicle according to claim 1 wherein the vehicle body is made substantially of at least one of a fiberglass material, carbon fiber material, and aramid fiber material.

9. An unmanned vehicle according to claim 3 wherein the fluid flowing along the tunnel from the leading edge of the wing to the trailing edge of the wing is air; wherein the at least one control surface system includes a control surface configuration and a control surface control system; wherein the navigation control system is configured to execute the air control instructions to operate the control surface control system and the control surface configuration to control the speed, the orientation, and the direction of travel of the vehicle in an atmospheric controlled glide.

10. An unmanned vehicle according to claim 3 wherein the fluid flowing along the tunnel from the leading edge of the wing to the trailing edge of the wing is at least one of air and water; wherein the at least one control surface system includes a control surface configuration and a control surface control system; and wherein the navigation control system is configured to execute the marine control instructions operate the control surface control system and the control surface configuration to control the speed, the orientation, and the direction of travel of the vehicle across the substantially planar water surface.

11. An unmanned vehicle according to claim 3 wherein the fluid flowing along the tunnel from the leading edge of the wing to the trailing edge of the wing is water; wherein the at least one control surface system includes a control surface configuration and a control surface control system; and wherein the navigation control system is configured to execute the submarine control instructions to operate the control surface control system and the control surface configuration to control the speed, the orientation, and the direction of travel of the vehicle while submerged in water.

12. An unmanned vehicle according to claim 11 wherein the submarine propulsion configuration comprises a plurality of vectored thrust apparatuses selected from the group consisting of propeller and water jet.

13. An unmanned vehicle according to claim 1 wherein the propulsion system is powered by at least one of an electric motor, a diesel motor, a turbine engine, and a nuclear reactor.

14. An unmanned vehicle according to claim 1 wherein the ballast system includes a ballast configuration that comprises at least one ballast chamber, at least one pressure tank, at least one water pump, at least one water port, and at least one air port;
    wherein the sensor system comprises at least one ballast sensor;
    wherein the at least one ballast chamber, the at least one pressure tank, the at least one water pump, and the at least one ballast sensor are carried by the at least one compartment;
    wherein the at least one pressure tank is vented to the at least one ballast chamber by a plurality of locking electronic valves that regulate air flow from the at least one pressure tank to the at least one ballast chamber;
    wherein the at least one ballast chamber is connected by at least one pipe to the at least one air port by a plurality of locking electronic valves that regulate the flow of air from the at least one air port into the at least one ballast chamber, and the evacuation of air from the at least one ballast chamber through the at least one air port;
    wherein the at least one ballast chamber is connected by at least one pipe to the at least one water port by a plurality of locking electronic valves and the at least one water pump that cooperate to regulate the flow of water into the at least one ballast chamber, and the evacuation of water from the at least one ballast chamber through the at least one water port;
    wherein the at least one ballast sensor measures volume of water and air in the at least one ballast chamber to support selective submerging and re-surfacing of the unmanned vehicle.

15. An unmanned vehicle according to claim 1 wherein the center of gravity system includes a center of gravity configuration that further comprises at least one threaded actuator rod and at least one internally threaded weight;
    wherein the at least one threaded actuator rod and the at least one internally threaded weight are carried by the at least one compartment;
    wherein the at least one actuator rod has rotational bearings on one end and motor actuators on the other end;
    wherein the at least one threaded actuator rod is encased in the at least one internally threaded weight, the position of which is adjustable along the length of the at least one actuator rod to move the center of gravity of the unmanned vehicle along two perpendicular axes.

16. An unmanned vehicle according to claim 7 wherein the pressurization system includes a pressurization configuration that comprises at least one bidirectional seal in the sealed hull, at least one pressure tank, at least one air port, and at least one air pump;
    wherein the sensor system comprises at least one pressure sensor;
    wherein the at least one pressure tank and the at least one pressure sensor are carried by the at least one compartment;
    wherein the bidirectional seals in the sealed hull are applied to one or more openings, vents, ports, and moving services carried by the vehicle body;
    wherein the at least one pressure tank is affixed to the interior portion of the sealed hull and vented to the at least one compartment by a plurality of locking electronic valves and the at least one air pump that cooperate to regulate air flow from the at least one pressure tank to the at least one compartment; wherein the at least one pressure tank is connected by at least one pipe to the at least one air port by a plurality of locking electronic valves and the at least one air pump that cooperate to regulate the flow of air from the at least one air port into the at least one pressure tank;
    wherein the at least one compartment is connected by at least one pipe to the at least one air port by a plurality of locking electronic valves that regulate the evacuation of air from the at least one compartment through the at least one air port;
    wherein the at least one pressure sensor monitors air pressure inside the sealed hull and ambient pressure outside said sealed hull to enable said sealed hull strength-to-weight characteristics by applying pressurization during selective operation of the unmanned vehicle in the air, on the surface of water, and below the surface of water.

17. An unmanned vehicle according to claim 1 wherein the at least one control surface system includes a control surface configuration that comprises at least one rudder, a plurality of rear trim plates, and a plurality of forward canards;
   wherein the sensor system comprises at least one control position sensor;
   wherein the at least one rudder is mounted on a strut affixed externally to the vehicle body and substantially near the trailing edge of the wing of the vehicle body;
   wherein the plurality of rear trim plates are affixed externally to the vehicle body and articulate independently and bidirectionally;
   wherein the plurality of forward canards are affixed externally to the vehicle body and articulate independently in two directions to achieve maximum roll of the unmanned vehicle; and
   wherein the at least one control position sensor monitors the position of the at least one rudder, the plurality of rear trim plates, and the plurality of forward canards to support physical maneuvering of the unmanned vehicle in the air, on the surface of water, and below the surface of water.

18. An unmanned vehicle according to claim 1 wherein the at least one power supply includes at least one battery in electrical communication with at least one of solar energy collectors, wave motion energy collectors, and generated energy collectors.

19. An unmanned vehicle according to claim 1 further comprising at least one device rack system carried by the vehicle body to provide mechanical, power, and signal mount points for auxiliary devices to articulate from the vehicle body of the unmanned vehicle.

20. An unmanned vehicle according to claim 19 wherein the at least one device rack system includes a retractable platform configuration for positioning at least one device to extrude from the vehicle body.

21. An unmanned vehicle according to claim 1 further comprising at least one payload deck system carried by the vehicle body to provide mechanical, power, and signal mount points for payload modules to interchangeably affix to the vehicle body of the unmanned vehicle.

22. An unmanned vehicle according to claim 1 further comprising at least one off board control system configured to interface with the on board mission control system to execute remote control over the operation of the unmanned vehicle based on mission objectives defined external to the on board mission control system.

23. An unmanned vehicle system comprising:
   an unmanned vehicle comprising:
      an aerohydrodynamic vehicle body configured to selectively operate in air, on a substantially planar water surface, and while submerged in water, and wherein at least a portion of the vehicle body comprises at least one enclosed hull that defines at least one enclosed interior compartment capable of pressurization, wherein the vehicle body includes a center wing characterized by a leading edge, a trailing edge, a port edge, a starboard edge, an upper surface, and a lower surface; and a pair of opposing sponsons characterized by a stepped hull design, wherein each sponson comprises a proximal wall positioned adjacent the wing and a distal wall positioned opposite the proximal wall; and wherein the sponsons are integrally coupled to the port and starboard edges of the wing, respectively, such that the proximal walls of the sponsons and the lower surface of the wing define therebetween a tunnel,
      a propulsion system carried by a portion of the vehicle body and configured to propel the unmanned vehicle,
      a ballast system carried by a portion of the vehicle body and configured to vary buoyancy of the unmanned vehicle,
      a center of gravity system carried by a portion of the vehicle body and configured to vary a center of gravity of the unmanned vehicle,
      a pressurization system carried by a portion of the vehicle body and configured to vary a pressure within the at least one enclosed interior compartment,
      at least one control surface system carried by a portion of the vehicle body and configured to maneuver the unmanned vehicle,
      a navigation control system carried by the vehicle body and configured to control a speed, an orientation, and a direction of travel of the unmanned vehicle,
      a sensor system carried by a portion of the vehicle body and comprising a plurality of environmental sensors configured to transmit environmental data and a plurality of operational sensors configured to transmit operational data,
      an on board mission control system carried by a portion of the vehicle body and comprising a rules engine configured to receive the environmental data and the operational data and from the sensor system and to issue autonomous operational instructions retrieved from an on board data store to control operation of the propulsion system, the ballast system, the center of gravity system, the pressurization system, the at least one control surface system, and the navigation control system, wherein the autonomous operational instructions comprise air control instructions, marine control instructions, and submarine control instructions, and
      at least one power supply carried by a portion of the vehicle body and configured to provide power to the propulsion system, the ballast system, the center of gravity system, the pressurization system, the at least one control surface system, the navigation control system, the sensor system, and the on board mission control system; and
   an off board control system in data communication with the on board mission control system and configured to issue at least one of manual operational instructions and semi-autonomous operational instructions to control operation of the on board mission control system of the unmanned vehicle;
   wherein the propulsion system, the ballast system, the center of gravity system, the pressurization system, the at least one control surface system, the navigation control system, and the on board mission control system are configured to execute the air control instructions to operate the vehicle body in the air, to execute the marine control instructions to operate the vehicle body on the surface of water, and to execute the submarine control instructions to operate the vehicle body below the surface of water.

24. An unmanned vehicle system according to claim 23 wherein the on board mission control system and the off board control system are in data communication with a network such that the semi-autonomous operational instructions from the off board control system are receivable by the on board mission control system, and the environmental data and operational data from the on board mission control system are receivable by the off board control system master;
   wherein the on board mission control system is configured to determine precedence among the autonomous operational instructions and the semi-autonomous operation instructions to control the operation of the unmanned vehicle;

wherein the off board control system is configured to use the environmental data and operational data to determine a status of the unmanned vehicle.

25. An unmanned vehicle system according to claim 23 wherein the vehicle body comprises at least one compartment adapted to carry at least one of the propulsion system, the ballast system, the center of gravity system, the pressurization system, the at least one control surface system, the navigation control system, the sensor system, and the on board mission control system.

26. An unmanned vehicle system according to claim 23 wherein the vehicle body comprises a hull; wherein the hull is a sealed hull provided by at least one pressure seal; and wherein an interior portion of the hull is pressurizable.

27. An unmanned vehicle system according to claim 23 wherein the propulsion system includes an aircraft propulsion configuration for propelling the unmanned vehicle in an atmospheric controlled glide, a marine propulsion configuration for propelling the unmanned vehicle across the substantially planar water surface, and a submarine propulsion configuration for propelling the unmanned vehicle while submerged in water.

28. An unmanned vehicle system according to claim 23 wherein the propulsion system is powered by at least one of an electric motor, a diesel motor, a turbine engine, and a nuclear reactor.

29. An unmanned vehicle system according to claim 23 wherein the ballast system includes a ballast configuration that comprises at least one ballast chamber, at least one pressure tank, at least one water pump, at least one water port, and at least one air port, and wherein the sensor system comprises at least one ballast sensor.

30. An unmanned vehicle system according to claim 23 wherein the center of gravity system includes a center of gravity configuration that further comprises at least one threaded actuator rod and at least one internally threaded weight.

31. An unmanned vehicle system according to claim 23 wherein the pressurization system includes a pressurization configuration that comprises at least one bidirectional seal in the sealed hull, at least one pressure tank, at least one air pump, and at least one air port, and wherein the sensor system comprises at least one pressure sensor.

32. An unmanned vehicle system according to claim 23 wherein the at least one control surface system includes a control surface configuration that comprises at least one rudder, a plurality of trim plates, and a plurality of forward canards, and wherein the sensor system comprises at least one control position sensor.

33. An unmanned vehicle system according to claim 23 wherein the at least one power supply includes at least one battery in electrical communication with at least one of solar energy collectors, wave motion energy collectors, and generated energy collectors.

34. An unmanned vehicle system according to claim 23 wherein the unmanned vehicle further comprises at least one device rack system carried by the vehicle body to provide mechanical, power, and signal mount points for auxiliary devices to articulate from the vehicle body of the unmanned vehicle; and wherein the at least one device rack system includes a retractable platform configuration for positioning at least one device to extrude from the vehicle body.

35. An unmanned vehicle system according to claim 23 wherein the unmanned vehicle comprises at least one payload deck system carried by the vehicle body to provide mechanical, power, and signal mount points for payload modules to interchangeably affix to the vehicle body of the unmanned vehicle.

36. An unmanned vehicle according to claim 18 wherein the on board mission control system is configured:
to interpret the operational data to indicate the unmanned vehicle is positioned on the surface of water or submerged in water;
to interpret the environmental data to indicate the unmanned vehicle is positioned in proximity to wave motion;
to issue the autonomous operational instructions including a power management directive to the at least one power supply to charge the at least one battery using the wave motion energy collectors.

37. An unmanned vehicle according to claim 18 wherein the on board mission control system is configured:
to interpret the operational data to indicate the unmanned vehicle is positioned on the surface of water or in air;
to interpret the environmental data to indicate the unmanned vehicle is positioned in proximity to solar energy;
to issue the autonomous operational instructions including a power management directive to the at least one power supply to charge the at least one battery using the solar energy collectors.

38. An unmanned vehicle according to claim 18 wherein the propulsion system is powered by at least one of an electric motor, a diesel motor, a turbine engine, and a nuclear reactor, and wherein the on board mission control system is configured:
to interpret the operational data to indicate the propulsion system is in a running state;
to interpret the environmental data to indicate the unmanned vehicle is positioned in proximity neither to solar energy nor to wave motion;
to issue the autonomous operational instructions including a power management directive to the at least one power supply to charge the at least one battery using the generated energy collectors.

39. An unmanned vehicle according to claim 9 wherein the on board mission control system is configured:
to interpret the operational data to indicate the unmanned vehicle is positioned in the air and is in motion at a first speed, a first orientation, and a first altitude;
to interpret the environmental data to indicate a vector having a first coordinate defined as a position of the unmanned vehicle and a second coordinate defined as an entry point of the surface of water;
to issue the autonomous operational instructions including an atmospheric controlled glide directive to the navigation control system and to at least one of the center of gravity system, the at least one control surface system, and the propulsion system in the aircraft propulsion configuration to achieve at least one of a second speed, a second orientation, and a second altitude.

40. An unmanned vehicle according to claim 10 wherein the on board mission control system is configured:
to interpret the operational data to indicate the unmanned vehicle is positioned on the surface of water and is in motion at a first speed and a first heading;
to interpret the environmental data to indicate a vector having a first coordinate defined as a position of the unmanned vehicle and a second coordinate defined as a destination;

to issue the autonomous operational instructions including a water surface deployment directive to the navigation control system and to at least one of the center of gravity system, the at least one control surface system, and the propulsion system in the marine propulsion configuration to put the unmanned vehicle in motion at at least one of a second heading having the destination as a coordinate and a second speed in the range of 100 to 200 knots.

41. An unmanned vehicle according to claim 1 wherein the on board mission control system is configured:
   to interpret the operational data to indicate the unmanned vehicle is positioned under the surface of water and is in motion at a first speed, a first orientation, a first depth, and a first heading;
   to interpret the environmental data to indicate a vector having a first coordinate defined as a position of the unmanned vehicle and a second coordinate defined as a destination;
   to issue the autonomous operational instructions including an underwater glide directive to the navigation control system and to at least one of the center of gravity system, the at least one control surface system, and the ballast system to put the unmanned vehicle in motion at at least one of a second speed, a second orientation, a second depth, and a second heading having the destination as a coordinate.

42. An unmanned vehicle according to claim 1 wherein the on board mission control system is configured:
   to interpret the operational data to indicate the unmanned vehicle is positioned on the surface of water or submerged in water and in a top-down orientation;
   to issue the autonomous operational instructions including a self-righting directive to at least one of the center of gravity system, the at least one control surface system, the propulsion system, and the ballast system to put the unmanned vehicle in a top-up orientation.

43. An unmanned vehicle according to claim 1 wherein the on board mission control system is configured:
   to interpret the operational data to indicate the unmanned vehicle is positioned on the surface of water or below the surface of water and is in motion at a first speed, a first orientation, a first depth, and a first heading;
   to interpret the environmental data to indicate the unmanned vehicle is positioned in proximity to a water current;
   to issue the autonomous operational instructions including a current navigation directive to the navigation control system and to at least one of the center of gravity system, the at least one control surface system, and the ballast system to put the unmanned vehicle in motion at at least one of a second speed, a second orientation, a second depth, and a second heading such that the water current transfers momentum to the unmanned vehicle.

* * * * *